US012657544B2

(12) United States Patent
Schick

(10) Patent No.: US 12,657,544 B2
(45) Date of Patent: Jun. 16, 2026

(54) HIERARCHICAL PROCESS MODEL REPRESENTATION WITH UPWARD CALLABILITY

(71) Applicant: SAP SE, Walldorf (DE)

(72) Inventor: Gerhard Schick, Rottenburg am Neckar (DE)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 18/529,846

(22) Filed: Dec. 5, 2023

(65) Prior Publication Data

US 2025/0182034 A1     Jun. 5, 2025

(51) Int. Cl.
*G06Q 10/067* (2023.01)
(52) U.S. Cl.
CPC .................................. *G06Q 10/067* (2013.01)
(58) Field of Classification Search
CPC .................................................... G06Q 10/067
See application file for complete search history.

(56) References Cited

U.S. PATENT DOCUMENTS 9,582,312 B1 *   2/2017   Karppanen ......... G06F 11/3466
2013/0276119 A1 * 10/2013   Edwards ............... G06F 21/554
726/24

2014/0282427 A1 *   9/2014   Fanning ................ G06F 11/366
717/128
2016/0085545 A1 *   3/2016   Togan ................... G06F 9/4486
717/121
2016/0124723 A1 *   5/2016   Ma .......................... G06F 16/00
717/144
2025/0086563 A1 *   3/2025   Dey ..................... G06Q 10/067

OTHER PUBLICATIONS

Stockenberg, John, and Andries van Dam. "Vertical migration for performance enhancement in layered hardware/firmware/software systems." Computer 11.5 (2006): 35-50. (Year: 2006).*

* cited by examiner

*Primary Examiner* — Scott M Tungate
(74) *Attorney, Agent, or Firm* — Klarquist Sparkman, LLP

(57)     ABSTRACT

Techniques and solutions are provided for defining and executing a process controller representation of a business process model. The business process model has a plurality of objects arranged in a hierarchy. Objects at multiple levels of the hierarchy are used to generate one or more of a service, a strategy, or a method of a process controller representation. A method of the process controller representation calls another process controller service or another process controller strategy. The business process model can be associated with multiple process controller representations, which can be associated with multiple, different computing systems.

20 Claims, 16 Drawing Sheets

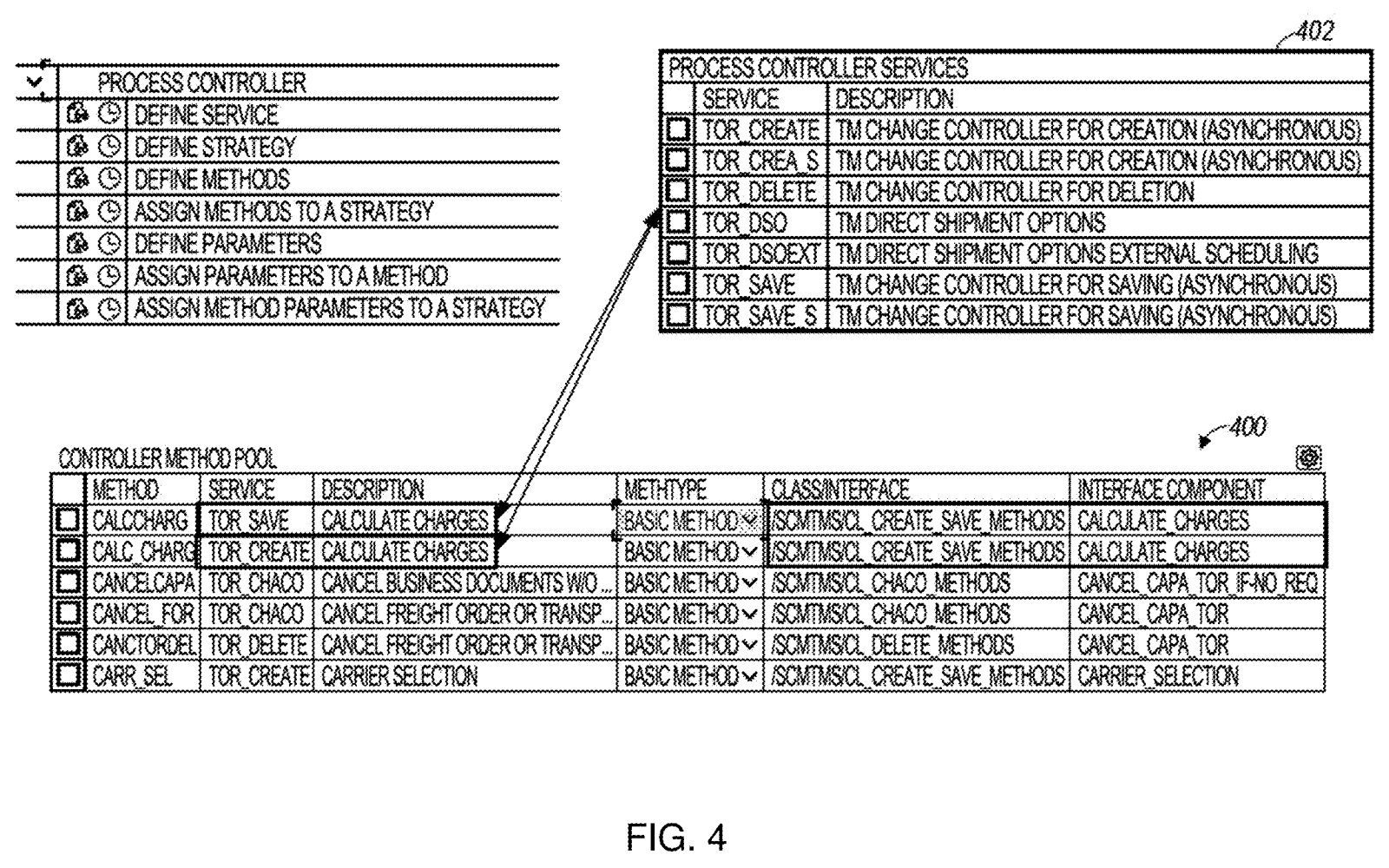

402 — PROCESS CONTROLLER SERVICES

| | SERVICE | DESCRIPTION |
|---|---|---|
| ☐ | TOR_CREATE | TM CHANGE CONTROLLER FOR CREATION (ASYNCHRONOUS) |
| ☐ | TOR_CREA_S | TM CHANGE CONTROLLER FOR CREATION (ASYNCHRONOUS) |
| ☐ | TOR_DELETE | TM CHANGE CONTROLLER FOR DELETION |
| ☐ | TOR_DSO | TM DIRECT SHIPMENT OPTIONS |
| ☐ | TOR_DSOEXT | TM DIRECT SHIPMENT OPTIONS EXTERNAL SCHEDULING |
| ☐ | TOR_SAVE | TM CHANGE CONTROLLER FOR SAVING (ASYNCHRONOUS) |
| ☐ | TOR_SAVE_S | TM CHANGE CONTROLLER FOR SAVING (ASYNCHRONOUS) |

PROCESS CONTROLLER

| | |
|---|---|
| ⚙ | DEFINE SERVICE |
| ⚙ | DEFINE STRATEGY |
| ⚙ | DEFINE METHODS |
| ⚙ | ASSIGN METHODS TO A STRATEGY |
| ⚙ | DEFINE PARAMETERS |
| ⚙ | ASSIGN PARAMETERS TO A METHOD |
| ⚙ | ASSIGN METHOD PARAMETERS TO A STRATEGY |

400 — CONTROLLER METHOD POOL

| | METHOD | SERVICE | DESCRIPTION | METH.TYPE | CLASS/INTERFACE | INTERFACE COMPONENT |
|---|---|---|---|---|---|---|
| ☐ | CALC.CHARG | TOR_SAVE | CALCULATE CHARGES | BASIC METHOD | ISO/TMS/CL_CREATE_SAVE_METHODS | CALCULATE CHARGES |
| ☐ | CALC_CHARG | TOR_CREATE | CALCULATE CHARGES | BASIC METHOD | ISO/TMS/CL_CREATE_SAVE_METHODS | CALCULATE CHARGES |
| ☐ | CANCEL.CAPA | TOR_CHACO | CANCEL BUSINESS DOCUMENTS WO.. | BASIC METHOD | ISO/TMS/CL_CHACO_METHODS | CANCEL_CAPA_TOR_IF-NO_REQ |
| ☐ | CANCEL_FOR | TOR_CHACO | CANCEL FREIGHT ORDER OR TRANSP.. | BASIC METHOD | ISO/TMS/CL_CHACO_METHODS | CANCEL_CAPA_TOR |
| ☐ | CANCTORDEL | TOR_DELETE | CANCEL FREIGHT ORDER OR TRANSP.. | BASIC METHOD | ISO/TMS/CL_DELETE_METHODS | CANCEL_CAPA_TOR |
| ☐ | CARR_SEL | TOR_CREATE | CARRIER SELECTION | BASIC METHOD | ISO/TMS/CL_CREATE_SAVE_METHODS | CARRIER_SELECTION |

FIG. 4

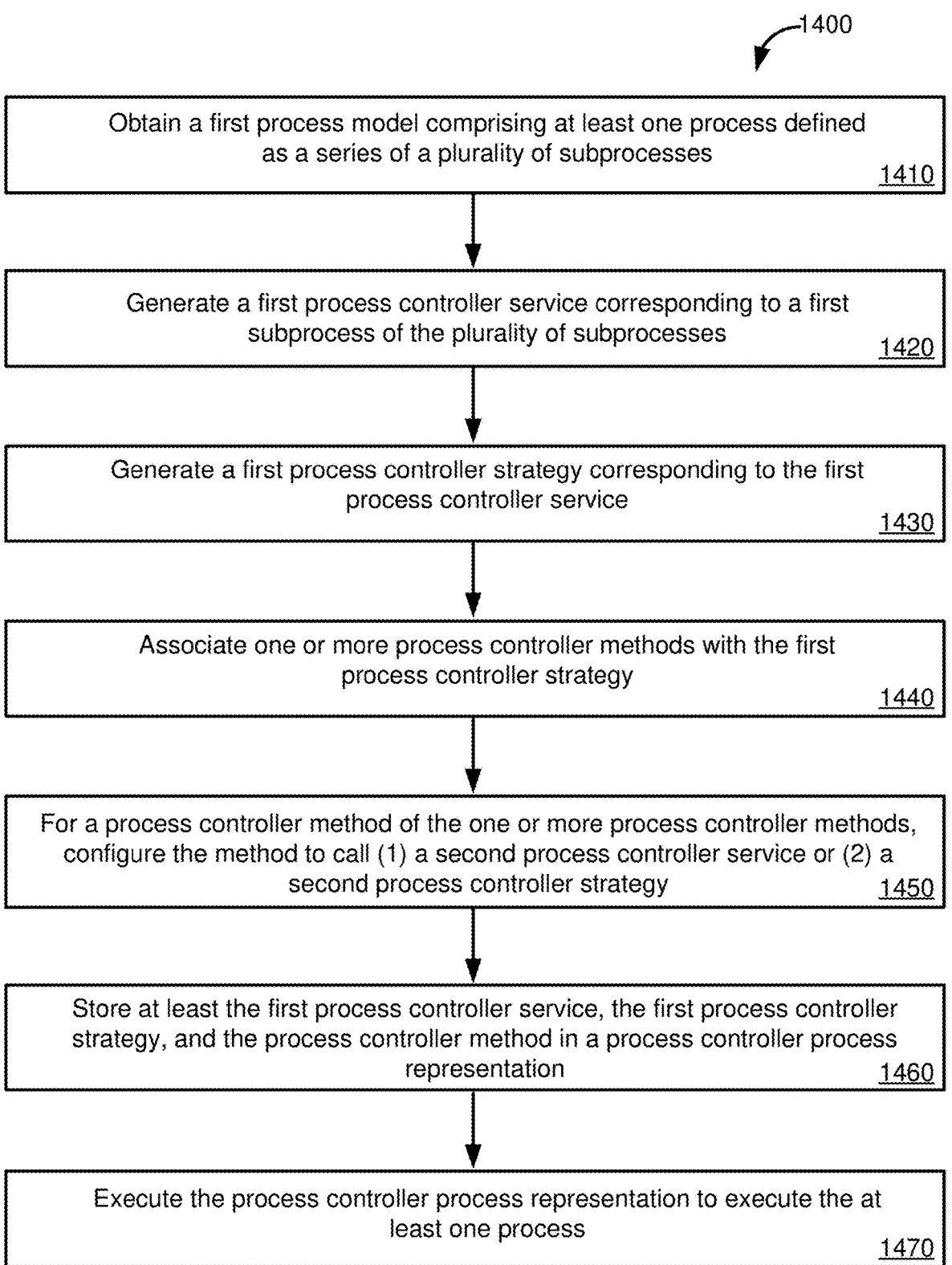

1400

Obtain a first process model comprising at least one process defined
as a series of a plurality of subprocesses                                1410

Generate a first process controller service corresponding to a first
subprocess of the plurality of subprocesses                               1420

Generate a first process controller strategy corresponding to the first
process controller service                                                1430

Associate one or more process controller methods with the first
process controller strategy                                               1440

For a process controller method of the one or more process controller methods,
configure the method to call (1) a second process controller service or (2) a
second process controller strategy                                        1450

Store at least the first process controller service, the first process controller
strategy, and the process controller method in a process controller process
representation                                                            1460

Execute the process controller process representation to execute the at
least one process                                                         1470

FIG. 14

COMMUNICATION CONNECTION(S) 1570

INPUT DEVICE(S) 1550

OUTPUT DEVICE(S) 1560

STORAGE 1540

COMPUTING ENVIRONMENT 1500

1530 graphics or co-processing unit 1515 central processing unit 1510

MEMORY 1525

MEMORY 1520

SOFTWARE 1580 IMPLEMENTING DESCRIBED TECHNOLOGIES

1600

HIERARCHICAL PROCESS MODEL REPRESENTATION WITH UPWARD CALLABILITY

FIELD

The present disclosure generally relates to automated software process definition and execution.

BACKGROUND

Software used in the management of business processes is among the most comprehensive and complex software currently in use. Nearly all businesses, but large enterprises in particular, have transformed from paper driven processes to data driven processes. Activities such as supply chain management, management of manufacturing processes, and logistics are accomplished using vast amounts of data and complex software processing, often integrating multiple different data systems and data sources. As even the general public is increasingly aware, business processes, such as supply chain and logistics, are not trivial, behind the scenes business issues, but are front and center in determining whether desired goods are available, as well as affecting the pricing of such goods.

Because of the complexity of enterprise level software applications, a variety of issues can arise. For example, as cloud computing becomes more ubiquitous, where processes can be more performant given the flexibility of cloud-based storage and processes, it can be desirable to transition from older "on premise" software solutions to cloud solutions. However, particularly given the complexity of the processes, it can be difficult to transfer or translate code developed for on-premise software applications to cloud-based software applications. Similarly, creating new software processes, or modifying existing processes, can be extremely intensive. Often, it can be difficult for a company to know what software solutions may already be available to assist in designing or implementing a process, and so duplication of work can occur. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for defining and executing a process controller representation of a business process model. The business process model has a plurality of objects arranged in a hierarchy. Objects at multiple levels of the hierarchy are used to generate one or more of a service, a strategy, or a method of a process controller representation. A method of the process controller representation calls another process controller service or another process controller strategy. The business process model can be associated with multiple process controller representations, which can be associated with multiple, different computing systems.

In one aspect, the present disclosure provides a process of defining and executing a process controller representation of a process model, where a method of the process controller representation calls a process controller service or a process controller strategy. A first process model is obtained that includes at least one process defined as a series of a plurality of subprocesses. A first process controller service is generated, corresponding to a first subprocess of the plurality of subprocesses. A first process controller strategy, corresponding to the first process controller service, is generated.

One or more process controller methods are associated with the first process controller strategy. For a process controller method of the one or more process controller methods, the method is configured to call (1) a second process controller service or (2) a second process controller strategy. At least the first process controller service, the first process controller strategy, and the process controller method in a process controller process representation are stored. The process controller process representation is executed to execute the at least one process.

The present disclosure also includes computing systems and tangible, non-transitory computer-readable storage media configured to carry out, or includes instructions for carrying out an above-described method. As described herein, a variety of other features and advantages can be incorporated into the technologies as desired.

BRIEF DESCRIPTION OF THE DRAWINGS

FIG. 4 is a diagram illustrating an example user interface allowing a relationship, or bridge, to be defined between components of a business process definition and development/execution components.

FIG. 14 is a flowchart of an example process of defining and executing a process controller representation of a process model, where a method of the process controller representation calls a process controller service or a process controller strategy

DETAILED DESCRIPTION

Example 1—Overview

Figure 1:
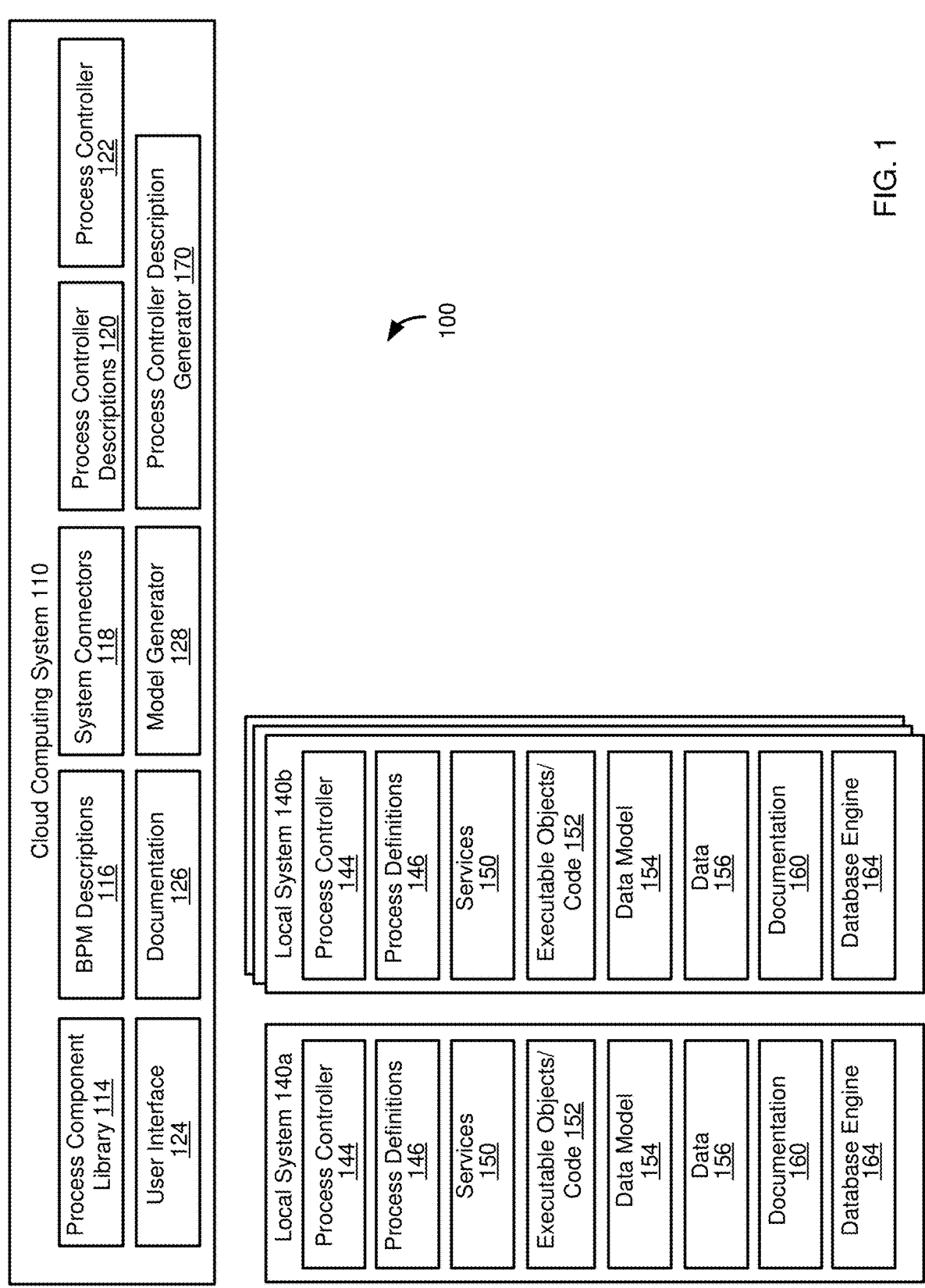
FIG. 1 is a diagram of an example computing environment in which disclosed techniques can be implemented.

Software used in the management of business processes is among the most comprehensive and complex software currently in use. Nearly all businesses, but large enterprises in particular, have transformed from paper driven processes to data driven processes. Activities such as supply chain management, management of manufacturing processes, and logistics are accomplished using vast amounts of data and complex software processing, often integrating multiple different data systems and data sources. As even the general public is increasingly aware, business processes, such as supply chain and logistics, are not trivial, behind the scenes business issues, but are front and center in determining whether desired goods are available, as well as affecting the pricing of such goods.

Because of the complexity of enterprise level software applications, a variety of issues can arise. For example, as cloud computing becomes more ubiquitous, where processes can be more performant given the flexibility of cloud-based storage and processes, it can be desirable to transition from older "on premise" software solutions to cloud solutions. However, particularly given the complexity of the processes, it can be difficult to transfer or translate code developed for on-premise software applications to cloud-based software applications. Similarly, creating new software processes, or modifying existing processes, can be extremely intensive. Often, it can be difficult for a company to know what software solutions may already be available to assist in designing or implementing a process, and so duplication of work can occur. Accordingly, room for improvement exists.

The present disclosure provides various techniques and solutions that can help address these issues. In one aspect, a business process model can be analyzed and represented in a format used by a process controller. That is, the business process model can be primarily used for visualizing and describing high-level elements of a process, where the process controller representation is used for actual process execution.

For organizational purposes, it can be useful to classify different hierarchical levels of a business process model representation as elements of various hierarchical levels used by a process controller. Generally, both the business process model representation and the process controller representation include higher levels presenting a greater level of abstraction, such as a description of an overall process that defines a task. In the process controller representation, these can be termed "services." A service can be implemented using one or more subprocesses, where typically a plurality of subprocesses are used, as well as particular "documents" that are associated with the subprocesses. A service, at least in some cases, can be specific to a particular software application component. Documents associated with a service can include logical data objects that represent business concepts or documents, such as BUSINESSOBJECTS of SAP SE. Documents can include underlying data objects, such as where a BUSINESSOBJECT can refer to objects in a virtual data model or database objects, and where virtual data model objects can refer to database objects.

One or more process controller strategies can be defined for a process controller service. In some implementations, process controller strategies can collect process controller methods that control the behavior of a document associated with a service. Process controller methods can be associated with computing methods that actually implement process functionality within a computing system. In other words, a process controller method serves as a bridge between a business modelling paradigm and a software execution paradigm. As an example, an ABAB class method can be assigned to a particular process controller method.

While process controller representations of processes exist, they can suffer from various limitations. For example, as described above, typically process controller methods are limited to calling particular executable code. Thus, it is not possible to call higher-level process controller elements, such as services or strategies, from a process controller method. This can be particularly limiting in scenarios where it can be desirable to have a cloud computing system manage an overall process, such as a process that is carried out using one or more local systems. For example, while it may be possible to have a process controller representation on the local systems, it may not be possible to use a process controller representation for the elements of the process that are defined for, and executed by, the cloud system.

In one aspect, the present disclosure provides an extended process controller that has methods that can be configured to execute elements at higher levels of a process controller hierarchy. For example, rather having a process controller method call a computing method (such as implemented in an ABAP programming language class method) containing all execution details, the process controller method can in turn call a process controller service, or a particular process controller strategy of a particular process controller service, including another strategy of the same service that is linked to that process controller method. In other cases, a method of the extended process controller can call a service, or a particular transaction.

The ability to link methods to higher-level process controller elements can thus allow processes to have more flexible grouping arrangements. Among other things, these grouping arrangements can facilitate reuse of process controller elements. For example, a strategy can be used with multiple services or be called by multiple methods. That is, new processes controller representations can be created more easily by having a flexible library of elements available for new processes. Similarly, processes can be modified or augmented using elements from other processes.

The disclosed techniques can also facilitate the implementation of processes that are managed by a cloud computing system, but where actual computing operations for the process are performed at other systems. For example, process controller services and strategies can be defined for a cloud-based process controller representation, where methods of the strategies call services or strategies of a local computing system.

In this regard, innovations of the present disclosure are described in two specific contexts. A "top down" approach can be used to generate a process controller representation of a particular business process model. A "bottom up" approach can be used to define a library of process controller elements that can be used to build at least certain parts of a new process, or to modify an existing process.

Example 2—Example Computing Environment for Process Definition and Execution Although the disclosed techniques can be used in a variety of scenarios, an example scenario that is described relates to migrating an existing business process, such as one implemented using an on-premise software implementation, to a new environment, such as a cloud-based environment. Often, a business process model may exist for the existing business process, but the actual implementation, or at least parts of it, may not be transferrable to a cloud environment.

A business process model generally has a plurality of levels that are hierarchically arranged. While not being limited to any particular hierarchy format, an example set of levels can be a highest level (level 0) that refers to a very general functionality that the business process performs, which can be referred to as a service. It can be thought of as a title or label for the process.

The immediately succeeding levels can relate to particular software suites or components. For example, a next-lowest level (level 1) can identify a particular software suite that executes process steps or subprocesses (such as SAP S/4 or SAP Transportation Management), while the next lowest level (level 2) can identify a particular module/subcomponent of the software suite used to execute the subprocess. For example, a module for S/4 could be "Material Management," while a module for Transportation Management could be "Planning."

The next level (level 3) can detail particular subprocesses associated with the overall process/service. The subprocesses can also be referred to as "segments." For a given set of values for levels 0-2 of a hierarchy, one or more subprocesses can be defined. Lower levels of the hierarchy can provide additional details regarding how a subprocess can be implemented. For example, a given subprocess may be associated with one or more activities that are performed, where the activities can be at the next lowest layer of the hierarchy (level 4). More granular details about how an activity is carried out can be provided at yet lower hierarchical levels, such as a next lowest layer (level 5) that indicates a particular computing operation that is to be performed, and a lowest layer (level 6) that identifies specific code that is to be executed, such as a particular service or a method of a particular computing class (such as, in SAP systems, an ABAP class).

As will be further described, when a BPM is being created, an option can be provided in a user interface screen to a allow user to create objects at a lower hierarchical level, such as by providing an "expand" control. Similarly, expand and collapse controls can be provided to allow a user to progressively view more granular details about a BPM, or to return to a more abstract view. Thus, an advantage of disclosed techniques is that they can allow users to define a BPM, and a corresponding process controller representation, in a no-code or low-code manner.

Levels in a BPM can have different meanings or uses. For example, in a described BPM, the highest levels of the BPM can be used to link the BPM to documentation for software applications or modules involved in the process. Lower levels can be more implementation specific, such as including details that allow a process controller model for the BPM to be created.

A variety of solutions are available for BPM creation and execution, including SAP SIGNAVIO, and products such as BOC GROUP ADONIS, MEGA, and CASEWISE.

FIG. 1 illustrates a computing environment 100 in which disclosed techniques can be implemented. In general, the computing environment 100 includes a cloud computing system 110 that communicates with one or more local systems 140 (shown as 140a and 140b). The computing environment 100 allows for execution and management of Business Process Management (BPM) workflows. This computing environment 100 allows high-level BPM constructs to be seamlessly translated into concrete, executable operations within local systems 140a and 140b, leveraging cloud resources for orchestrating actions across diverse local systems.

The cloud computing system 110 includes a user interface 124 that facilitates the creation, modification, and visualization of BPM models. This user interface 124 is supported by underlying logic that allows for the dynamic importation and integration of data from local systems 140 for BPM model generation, facilitated by a model generator 128. The model generator 128 uses various processes to transform raw system data, including configuration settings, master data records, and transactional data streams, into a coherent initial BPM model. For example, in systems of SAP SE, the SAP Test Data Migration Workbench can be used to extract information of a production system, including system configuration data, master data, and transactional data, and this functionality can be called by the model generator 128, or information generating using such a tool can otherwise be provided to the model generator 128. The extracted information is related/belong together, and thus form a complete "slice" of a production system (where a slice can be considered as a subsystem of the production system).

BPM descriptions 116 serve as a repository of high-level process definitions that encapsulate the general business logic and workflow sequences. These descriptions 116 are typically conceptual representations that do not contain the specific technical details necessary for execution. In contrast, process definitions 146 of the local computing systems 140 enrich these high-level BPM descriptions 116 with execution details, including service tasks and user tasks, which are necessary to create an executable model. The process definitions 146 can correspond to local process controller representations, whose execution is managed by a process controller 144. A process controller 122 of the cloud computing system can be used to manage the execution of process controller descriptions 120 of the cloud computing system.

Particular portions of a process controller description 120 can be represented in a process component library 114. For example, the process component library 114 can store various identifiers of process controller services, strategies, and methods for the process controller descriptions 120, including relationships between such components. As will be further described, the process component library 114 can be used when creating or modifying process controller descriptions 120.

System connectors 118 provides a middleware layer that operationalizes communication between the cloud computing system 110 and the local systems 140. For example, the cloud computing system 110, such as using a process controller 122, can manage an overall business process (of a BPM description 116, as implemented using one or more process controller descriptions 120) calling a process controller 144 of a local system 140 to cause execution of actual process steps using the system connectors 118. The system connectors 118 can be implemented as APIs or service endpoints capable of handling low-latency command issuance and data synchronization tasks.

Within each local system 140a, 140b, the local process controller 144 interprets and enforces the process definitions 146, which execute process steps, such as by calling services 150 or executable objects/code 152 of the respective local system. Services 150 can represent modular and reusable business logic components that the process controller 144 invokes. The services 150 can encapsulate specific function-alities, such as calculating financial metrics or managing customer data, and are exposed through well-defined inter-faces. That is, for example, services 150 of multiple systems can implement the same interface, facilitating interaction between the local systems 140 and the cloud computing system 110. The executable objects/code 152 can include compiled code blocks or scripts that perform specialized tasks within the process execution flow, often using real-time computation and data manipulation capabilities.

A data model 154 can be provided that outlines the organization and relationships of data entities (table or views, for example, but which can also include higher-level objects, such as objects in a virtual data model or logical data objects (such as SAP's BUSINESSOBJECTS)) within the local systems 140. The data model 154 can be designed to optimize both transactional throughput and analytical query performance, supporting complex data structures like rela-tional tables, multidimensional cubes, or graph-based rep-resentations. Data 156 represents the live instances of enti-ties defined by the data model 154, which are manipulated during process execution. These can include persistent stor-age constructs like rows in a table or transient constructs like in-memory objects.

Documentation 126 and 160 provide details about the high-level BPM components and the executable process elements, respectively. The documentation 126, 160 can serve as an instructional guide for system integrators and a reference manual for ongoing system maintenance and upgrades. It typically includes API documentation, data dictionaries, and detailed descriptions of each component's functionality and interactions.

A database engine 164 executes complex queries and transactions involved in process execution. The database engine 164 can interface directly with the data model 154 and the data 156 to retrieve, update, and persist data as dictated by the ongoing processes.

The workflow from conceptual BPM to executable pro-cess follows a series of detailed steps within this architecture of the computing environment 100. Initially, the cloud computing system 110 can create a BPM description 116, either through the user interface 124 or using the model generator 128, which synthesizes data from a local system 140 into a preliminary business process model. High-level BPMs, such as the BPM descriptions 116, can then be refined through the user interface 124.

Subsequently, the enriched process definitions 146/pro-cess controller descriptions 120 are defined, incorporating execution details such as service tasks and user tasks. The cloud computing system 110 then manages process execu-tion by orchestrating interactions with the local systems 140 via the system connectors 118. Local process controllers 144 within the local systems 140 interpret these descriptions to execute the processes, invoking services 150 and executable objects/code 152 as appropriate, with the database engine 164 supporting data transactions throughout the execution phase.

Aspects of the present disclosure include automatically generating process controller descriptions 120 from BPM descriptions 116. This task can be carried out by a process controller description generator 170. Levels of a BPM descriptions 116 can be associated with particular logic in the process controller description generator 170 to generate different components of a process controller description 120. For example, lower hierarchical levels of a BPM description 116 can correspond to components of a process controller description 120, such as services, strategies, or methods of a process controller description. The process controller description generator 170 can create object instances of a process controller description 120/representation that corre-spond to elements of a BPM description, including in at least some cases populating the object with at least some values for variables associated with a given object.

Figure 2:
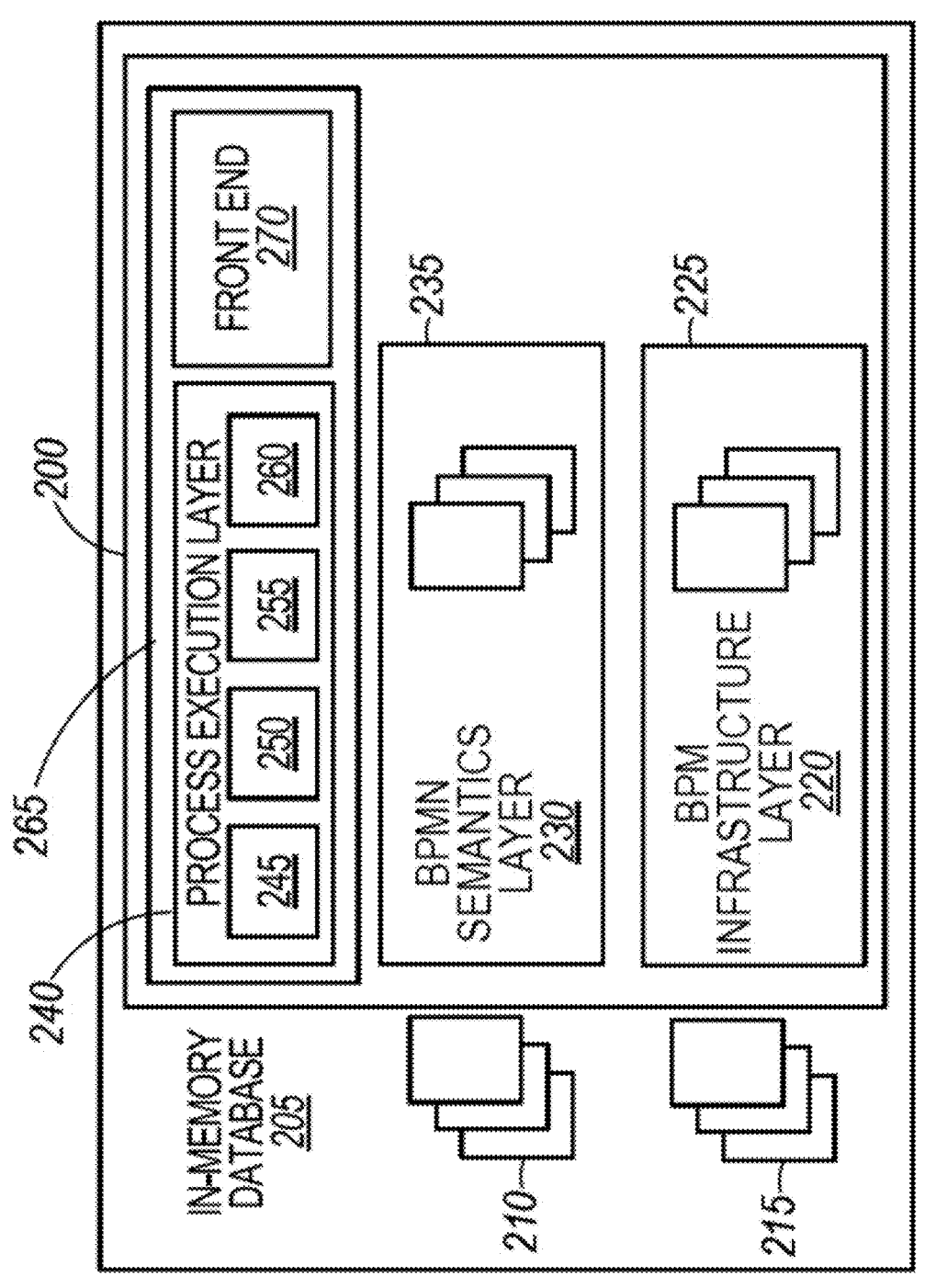
FIG. 2 is a diagram of a computing environment where a BPMS runtime is layered on an in-memory database.

FIG. 2 introduces a BPMS (Business Process Model System) runtime 200, which corresponds to aspects of the cloud computing system 110 or the local systems 140 of FIG. 1. Layered on an in-memory database 205, the BPMS runtime 200 is an exemplary embodiment capable of imple-mentation within a distributed computing system, echoing the multi-system orchestration seen in the computing envi-ronment 100. The in-memory database 205 can include one or more database tables 210 and one or more data cubes 215. The in-memory database 205 in FIG. 2 can represent a particular type of database engine 164 of FIG. 1.

This BPMS runtime 200 maps process models and core runtime components to database views and stored proce-dures, such as SQLScript, which are akin to the process controller descriptions 120 or process definitions 146 of FIG. 1 that translate high-level BPM constructs into execut-able operations. The BPMS runtime 200 includes a BPM infrastructure layer 220, a BPMS semantics layer 230, and a process execution layer 240, which collectively resemble the multi-layered architecture of the cloud computing sys-tem 110 of FIG. 1, incorporating model generation, trans-formation, and execution functionalities.

The BPM Infrastructure Layer 220 parallels the data model 154 and database engine 164 of FIG. 1, providing underlying data structures and capabilities for process man-agement, including monitoring, administration, and version-ing, much like the comprehensive documentation and user interaction features of the cloud computing system 110.

Similarly, the BPMN semantics layer 230 in FIG. 2 is reflective of the executable objects/code 152 and services 150 within the local systems 140 of FIG. 1. This layer 230 includes a suite of reusable procedures tailored to execute BPMN artifacts, effectively performing the same function as the local process controllers 144 by executing process definitions and tasks.

The process execution layer 240 in FIG. 2 introduces a detailed 'Queue' view for managing process execution readiness, which corresponds to the execution logic within the local systems 140a and 140b in FIG. 1. The process execution layer 240, equipped with a scheduler procedure, can be seen as an extension of the process orchestration conducted by the cloud computing system 110.

Within FIG. 2, the compiler 265, including its front end 270, serves to transform BPM models into executable com-ponents. This compiler 265 mirrors the transformation capa-bilities within the cloud computing system 110 of FIG. 1, which translates enriched BPM models into detailed execut-able scripts.

Turning to the BPM infrastructure layer 220, one or more data structures 225 are stored in this layer. Such data structures 225 may include, for example, processes, tokens, events, and otherwise. Entities of the BPM Infrastructure Layer 220 may be stored in a schema "BPM." For example, representations of the processes may be centered around process instances and tokens therein, which become records in a PROCESSES and TOKENS table, respectively. Process instances may denote the existence and lifetime of a single instantiation of some process model.

Process instances may carry some metadata attributes, such as, for example, a SUSPENDED flag, denoting whether or not the process can currently make and progress. Process instances may also be nested, forming hierarchies of parent processes and sub processes, represented by a PARENT_ID foreign key attribute, identifying one process instance's parent process and another PARENT_TOKEN_ID foreign key attribute that identifies the parent process's token, which has triggered the sub-process activity launching the particular (sub-) process instance. The sub-process instance may, in some embodiments, be used to correctly resume an (invoking) parent process when the (invoked) sub-process is complete.

Tokens, in turn, may represent a thread of control within a process instance (e.g., markers walking through the corresponding process model). Whatever process step a token currently "points to" may, in some instances, be the next step to be executed. Multiple tokens within one process instance may denote multiple concurrent threads making simultaneous (e.g., substantially or otherwise) progress in that process instance. In other words, multiple tokens can indicate parallel processing.

The BPM infrastructure layer 220 may also provide for support functionality to facilitate correctly prioritized de-queuing of ready-to-execute process steps from the view in the process execution layer 240. Turning to the BPMN semantics layer 230, as illustrated, this layer includes procedures 235 (e.g., SQLScript procedures) for BPMN artifacts such as various types of events, activities, and gateways. The illustrated BPMN semantics layer 230 may define the procedures that correspond to the baseline control flow artifacts, for example: start and end events (instance lifecycle), various types of gateways (e.g., conditionals, concurrency, synchronization), basic activities (e.g., updating business objects (and other business data) stored in the database), and sub-process invocation and completion (e.g., process aggregation and structuring). The procedures 235 described below may capture the "action" part of various BPMN artifacts (i.e., what is done when that artifact gets executed). Such procedures 235 (e.g., SQLScript procedures) may be called in the course of process execution as done as part of the process execution layer 240. In other words, those procedures 235 make certain implicit contextual assumptions in the particular situation which they are being called.

The process execution layer 240 represents a specific process model, e.g., each process model yields its own process execution layer 240. Specifically, the compiler 265 may bridge the gap between the process modeling language (e.g., BPMN 2.0) and its executable representation atop the in-memory database 205 (e.g., SQL and SQLScript).

In the illustrated embodiment, the process execution layer 240 includes four parts. First, a queue view definition 245 accommodates the contextual conditions for each process step to be triggered. As such, it may take the state of the control flow (e.g., token positions, process suspension, etc.) into account. The queue view definition 245 may further evaluate branch conditions and prepare, for example, SQLScript arguments for calling the procedures of the BPMN semantics layer 230 with the custom contextual arguments.

Second, a scheduler 250 (e.g., scheduler SQLScript procedure) polls the queue view definition 245 for ready-to-be-executed procedures, such as SQLScript procedures. This includes fetching and parsing the corresponding parameters, and ultimately executing the SQLScript procedure.

Custom procedures (e.g., SQLScript) and other database entities (such as tables, views, etc.) 255, which extend the standard library functionality from the BPMN semantics layer 230, may be included in the process execution layer 240.

A process API 260, made up from a number of procedures (e.g., SQLScript) that perform basic interactions with processes, is included in the illustrated embodiment. Such interactions may include, for example, to launch a new instance, monitor processes, abort processes, and so forth.

In some example embodiments, the BPMS runtime 200 layered on the in-memory database 205 may follow a rule-driven approach in which each process step is guarded by a rule specifying its contextual conditions. Such conditions may define when some process step is ready to be executed. It may refer to the state of the process (in particular the position of its tokens) and also incorporate other predicates (like routing conditions for decision gateways). Further, the conditions also need to calculate the parameters that are fed into some procedures. For instance, many procedures may require the token identity (i.e., the primary key of a record in the TOKENS table) and the position to which the token shall be set when completing the process step to be passed in. As the number and type of parameters varies for different process steps, the view condition merely assembles a Uniform Resource Locator (URL)-encoded string which is later parsed by the scheduler 250 (e.g., calling the DECODE_PARAMETERS procedure from the BPM Infrastructure layer) and passed into the procedures 235 (as the parameters argument).

At any point in time, there may be multiple running process instances (that correspond to one and the same process execution layer 240) where each process instance may further make progress with multiple tokens such that a number of process steps may be "ready" for execution. For example, the individual rules (representing the contextual assumptions of the process steps) may be assembled into a single queue view definition 245 (e.g., named QUEUE). That view can be queried for ready-to-run process steps, represented by a tuple that (among other data) refers to the affected process instance, a logical name of the artifact, and custom (e.g., string-encoded) arguments to a procedure 235 (e.g., SQLScript) that performs the corresponding business logics.

The process scheduler 250, in some embodiments, may be another procedure (e.g., SQLScript) that regularly queries the queue view definition 245 and executes the procedure 235 of the top-most query result.

The process API 260 includes various procedures (e.g., SQLScript) to interact with a process instance (or multiple instances) and to monitor the course of process execution.

The methodology described earlier creates arbitrary processes from existing functions, sub-processes, and so forth. Specifically, a business process is described with a set of sub-business possesses that are possible to be classified. A BPM is used to model suitable sub-business process levels. The sub-business processes are then classified according to a library set of characters used in the cloud service library. Suitable cloud services are then obtained from the cloud service library and the sub-processes are described by the sequence of cloud services. The BPM is then used to create a hierarchical business process with both horizontal and vertical sub-process dependencies and/or relationships. The hierarchical service groups and group elements are then extracted and status profiles controlling the automated execution of cloud services are created, respecting the hierarchical dependencies.

Figure 3:
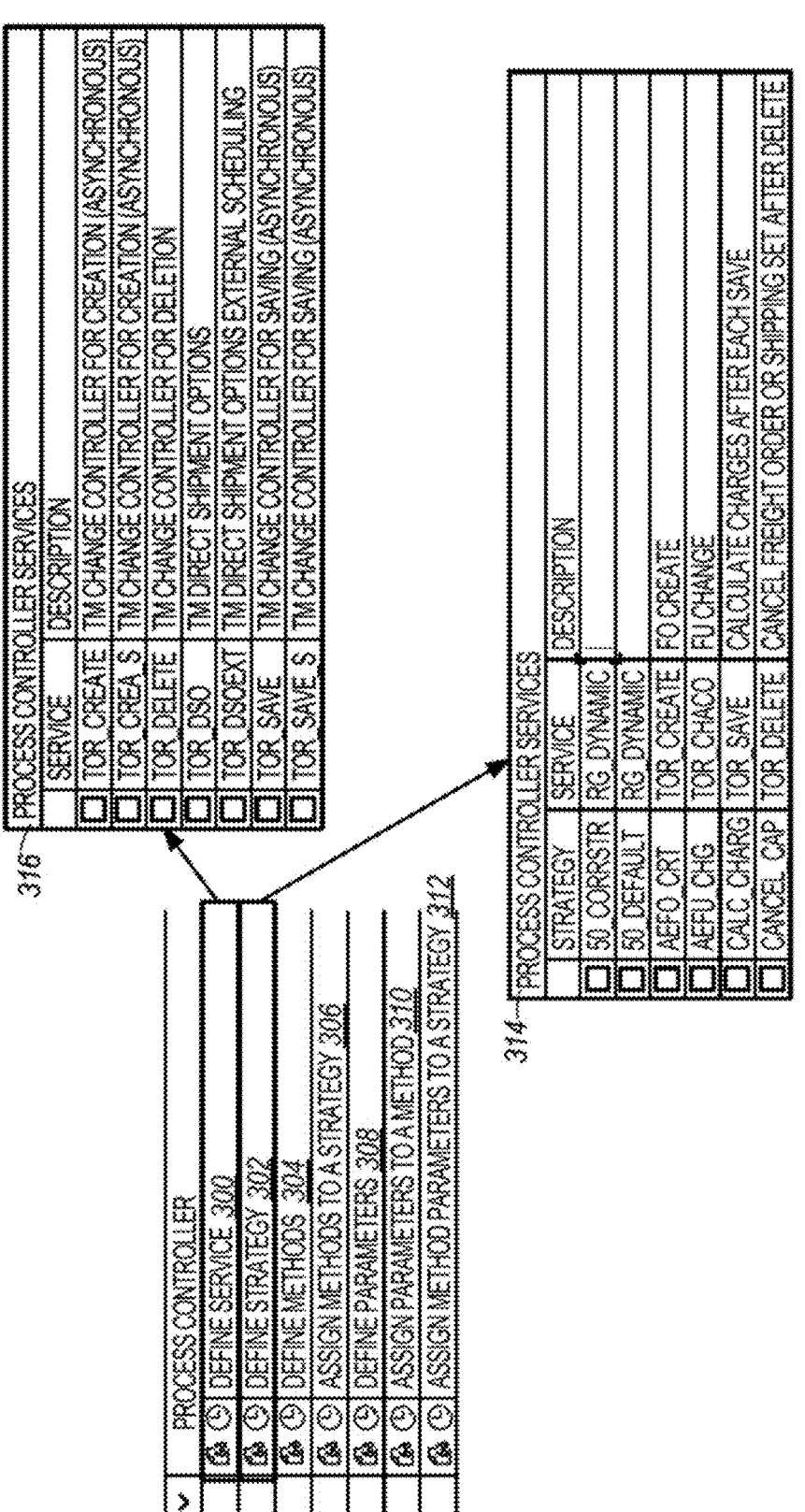
FIG. 3 is a diagram illustrating a user interface for process controller definition and setup.

A process controller 270 is provided to tie together vertical and horizontal processing. FIG. 3 is a diagram illustrating process controller definition and setup, in accordance with an example embodiment. There are seven steps that are performed using the process controller. These include define service 300, define strategy 302, define methods 304, assign methods to a strategy 306, define parameters 308, assign parameters to a method 310, and assign method parameters to a strategy 312.

After defining services, a list of process controller services 314 may appear. Likewise, after defining strategies, a list of process controller strategies 316 may appear.

The process controller 270 of FIG. 2 also acts as a bridge between business process definitions and development requirements. FIG. 4 is a diagram illustrating how this bridge is formed, in accordance with an example embodiment. Specifically, controller methods in a controller method pool 400 may be linked, using the process controller 270, to one or more process controller services 402.

Figure 5:
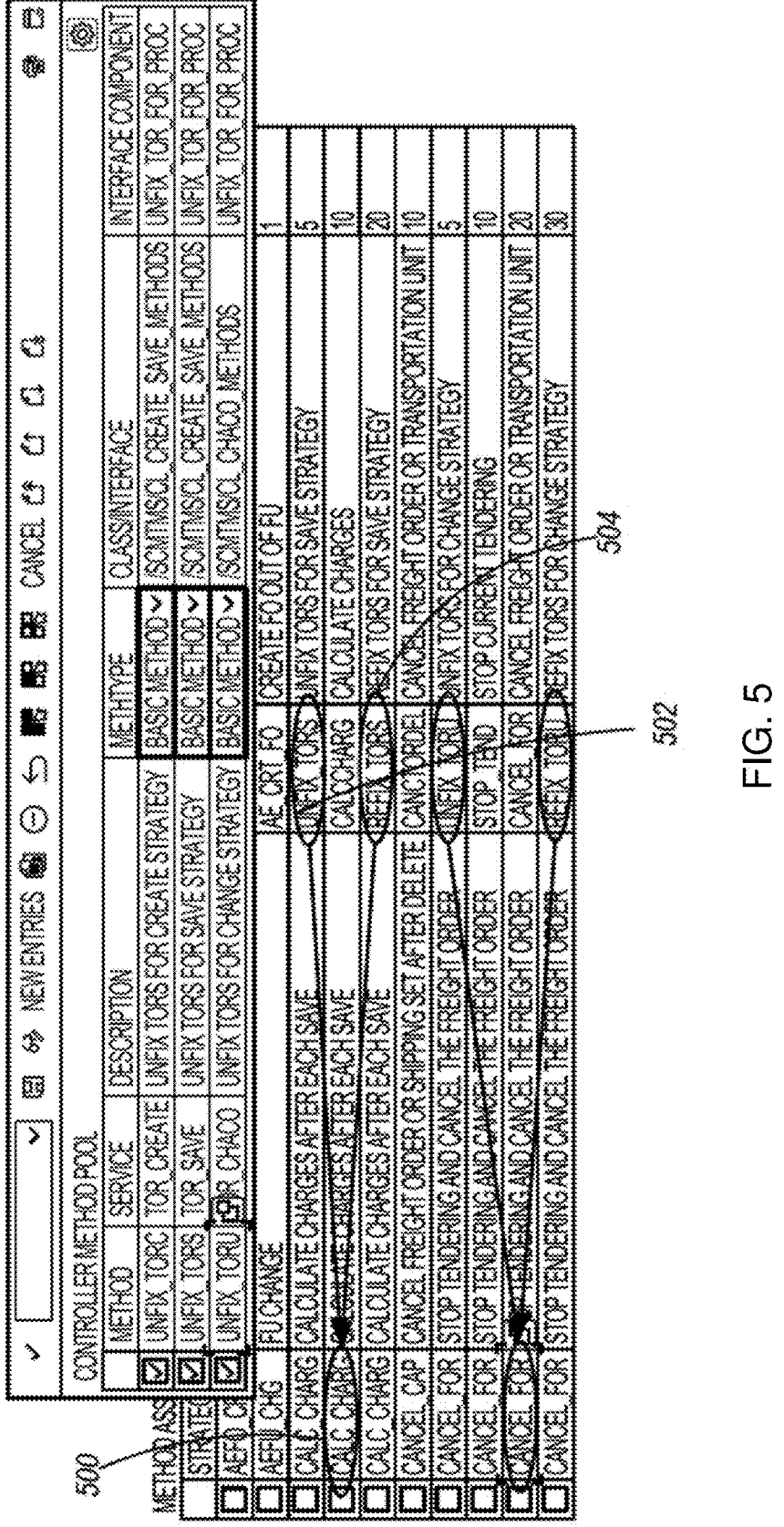
FIG. 5 is diagram illustrating an example user interface that allows a process controller method to be assigned to multiple process controller strategies.

A process controller method assignment is developed a single time, but then can be assigned multiple times. FIG. 5 is a diagram illustrating process controller methods being assigned multiple times, in accordance with an example embodiment. Here, for example, a calculate charges after each save strategy 500 can be assigned to multiple process controller methods 502, 504. While not pictured, these multiple process controller methods 302, 304 can actually be on multiple different ERP systems.

A service group includes individual process steps of a strategy that can be executed at arbitrary locations. Service groups contain variants of a business process step. While a strategy is a business process, the service groups are the elements out of which concrete process steps are chosen. As soon as the execution of a process controller method is restricted to a single location, it is more appropriate to discuss it as a business service provided at that location. Hence, a business service is a functionality that is offered at a particular location, and the specific process controller methods assigned to the location are the potential members for the service groups.

Example 3—Example Business Process Model

Figure 6:
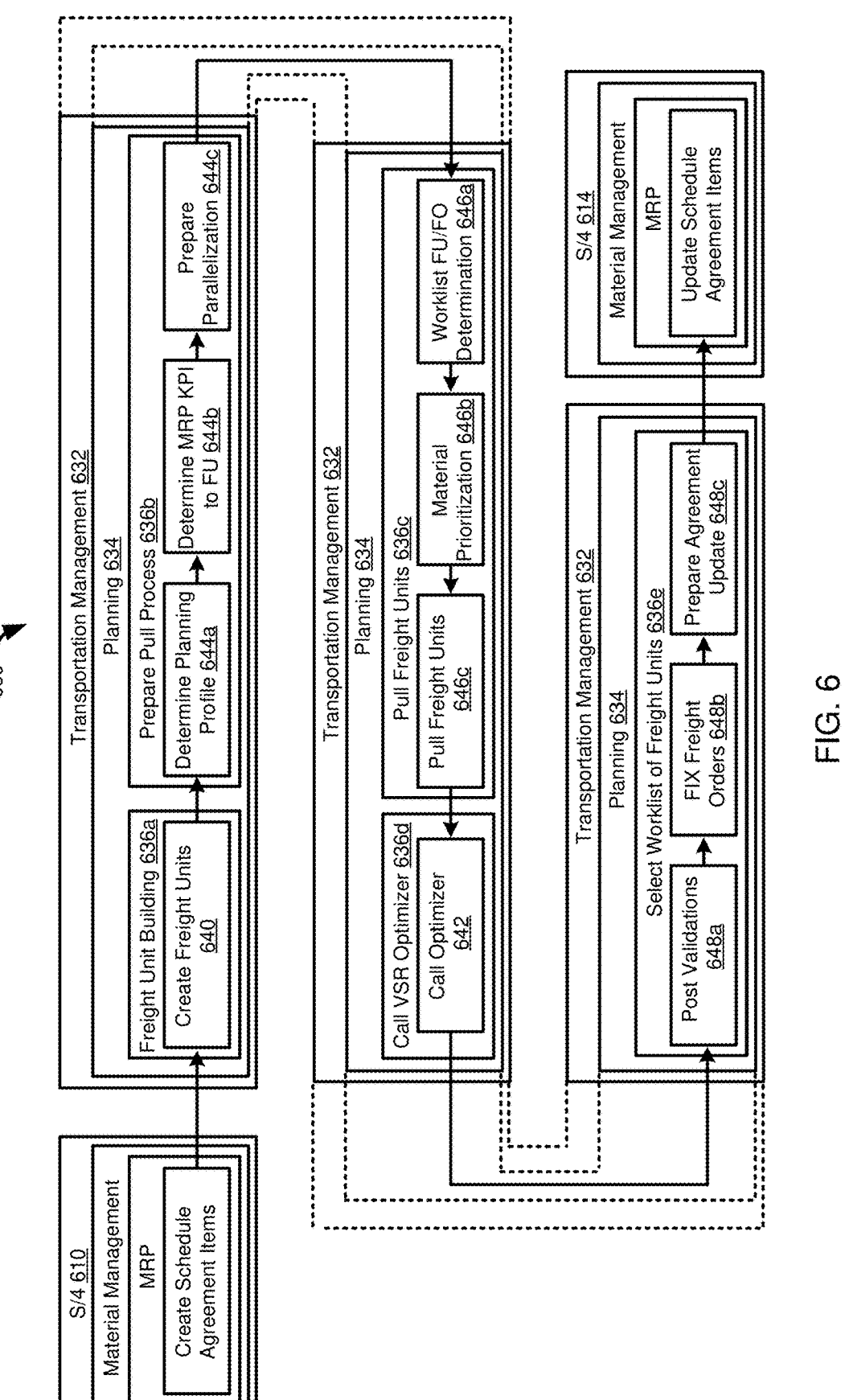
FIG. 6 illustrates an example, hierarchical process definition.

FIG. 6 illustrates an example business process 600 that involves freight shipping logistics. The business process 600 include four levels of the hierarchy described above in Example 2 (levels 1-4, where level 0 represents the business process itself, which can be assigned a title/label/identifier). A first set of elements 610 corresponds to a first set of values for the second two hierarchical levels (levels 1 and 2), corresponding to the Material Management module (level 2) of the S/4 software application (level 1), both of SAP SE. The subprocess (level 3) is MRP (material requirements planning), which includes a single activity (level 4) "create schedule agreement items".

The first set of elements 610 is followed by a second set of elements 612. The second set of elements 612 illustrates how a single software application (level 1) and a single module (level 2) of the software application can have multiple subprocesses, where each subprocess can in turn have one or more activities. In this case, the second set of elements 612 is defined for Planning module 634 (level 2) of the Transportation Management software application 632. There are five distinct subprocesses 636a-636e. Subprocesses 636a and 636c have respective single activities 640, 642. Subprocesses 636b, 636d, and 636e each include three activities, respectively 644a-644c, 646a-646c, 648a-648c. A third set of elements 614 is defined for the Material Management module of S/4.

The first, second, and third sets of elements 610, 612, 614 are shown as connected in a sequence, where the sequence at least partially defines an order for the process 600. Within a given set of elements 610, 612, 614, internal subprocesses are also shown as sequentially connected, such as for subprocesses 636a-636e, which further defines the order for the process 600.

Figure 7:
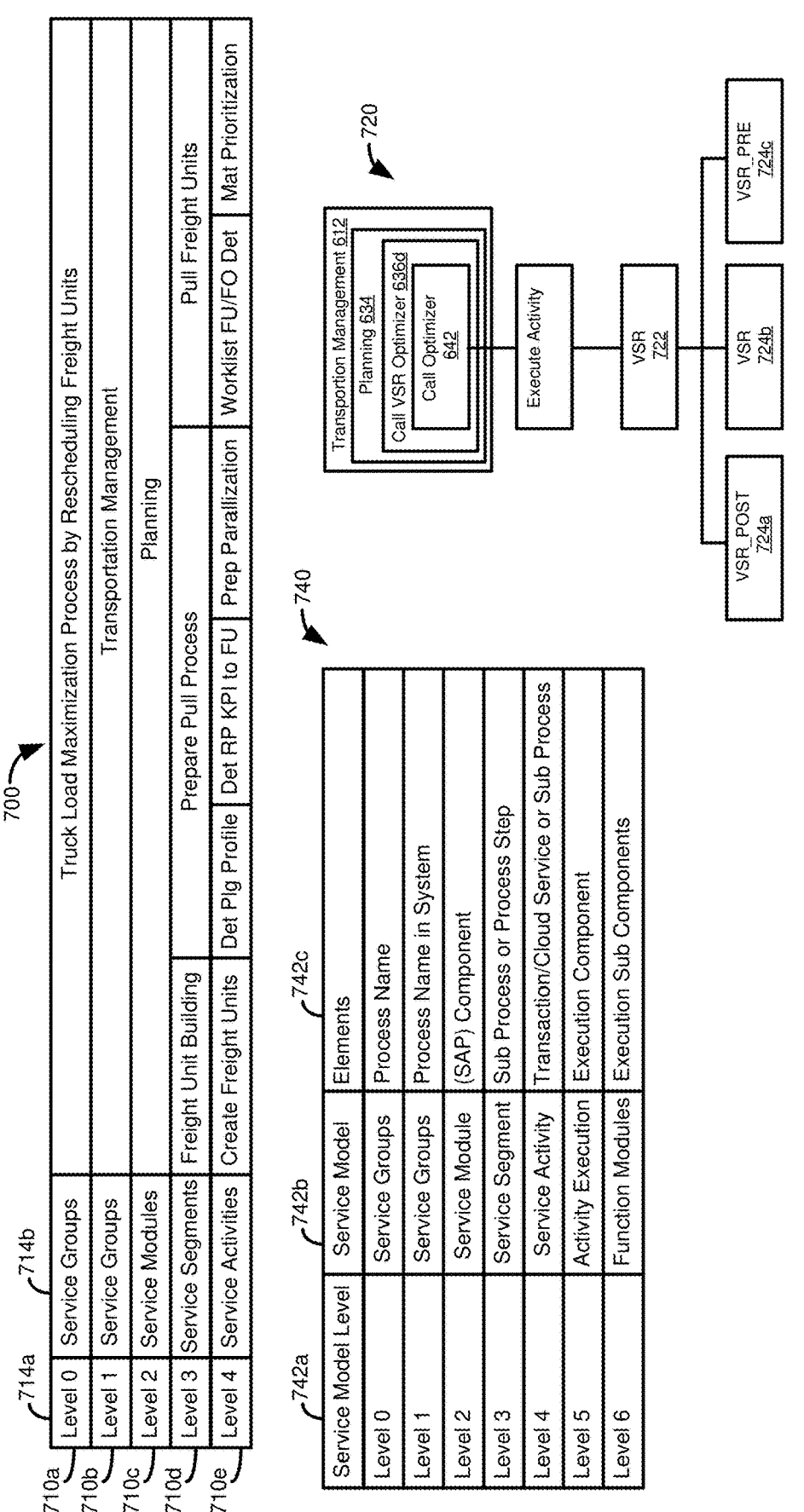
FIG. 7 provides an alternative representation of the process definition of FIG. 6, with an expanded subprocess definition and a summary of components of a general, hierarchical process schema.

FIG. 7 illustrates a tabular representation 700 of a portion of the hierarchical process model 600 depicted in FIG. 6. This tabular representation organizes the elements according to the process model hierarchy levels, detailing the subprocesses 636a and 636b, as well as their associated activities 640, 644a-644b. The structure of representation 700 is rendered in rows 710a-710e, where each row signifies a distinct level within the five-tier hierarchy.

Column 714a enumerates the hierarchical levels, beginning from the topmost "Level 0" and descending to "Level 4". Adjacent to this, column 714b identifies the type or classification pertinent to each hierarchical stage. As the hierarchy progresses, these classifications shift from broad categories at the uppermost levels to increasingly specific categories at the lower levels.

The subsequent segment of the table diverges from the conventional columnar structure due to the hierarchical nature of the model. Instead of fixed columns, each subsequent cell can be subdivided into multiple cells at the succeeding lower level, reflecting the one-to-many relationship between elements at adjacent levels of the hierarchy. For instance, a single "Level 1" entity might encompass multiple "Level 2" entities beneath it, and so on down the hierarchy. This cascading structure captures the complexity and interconnectivity of subprocesses and activities within the overall process.

The tabular representation 700 thus serves as a blueprint, illustrating the breakdown of services into modules, modules into segments, segments into activities, and activities into transactions or cloud services, as seen in the decomposition of service groups down to service activities.

As discussed, a hierarchical structure for a process description can have more (or less) than five levels. FIG. 7 illustrates an expanded representation 720 of the subprocess 636d of FIG. 6. In addition to the call optimizer activity 642, the expanded representation 720 indicates that a VSR function/method 722 is called, which can correspond to level 5 of the hierarchy. In turn, the VSR function/method 722 causes specific methods or services 724a-724c to be executed, such as the VSR_POST and VSR_PRE ABAP code and the VSR service (where VSR represents the Vehicle Scheduling and Routing functionality of SAP's Transportation Management software solution).

FIG. 7 illustrates a table 740 that provides a general hierarchy description for business process models. A column 742a indicates a hierarchical level of a given row of the table 740, a column 742b provides a description of the service model classification for the level, and an elements column 742c indicates what types of elements are associated with a given level. As with the representation 700, the levels represented in the table 740 are listed in order of increasing granularity, from "conceptual" representations to concrete functions that can be executed to accomplish process steps.

As described in Example 1, a business process model representation of a process (or service) can also be reflected in a process controller representation. Services of a process controller representation, as discussed in Example 1, can group particular subprocesses or documents that are used in subprocesses. Services can, in at least some implementations, correspond to levels 1 and 2 of the business process model hierarchy discussed above. Strategies of the process controller representation can correspond to levels 3 and 4 of business process model hierarchy. Methods of the process controller representation can correspond to levels 4 and 5 of the business process model hierarchy.

In one aspect, then, a business process model can be analyzed such that components of the business process model can be classified as services, strategies, or methods of a process controller representation depending on the hierarchical level of the component in the business process model.

Example 4—Example Process Controller Process Representation

Figure 8:
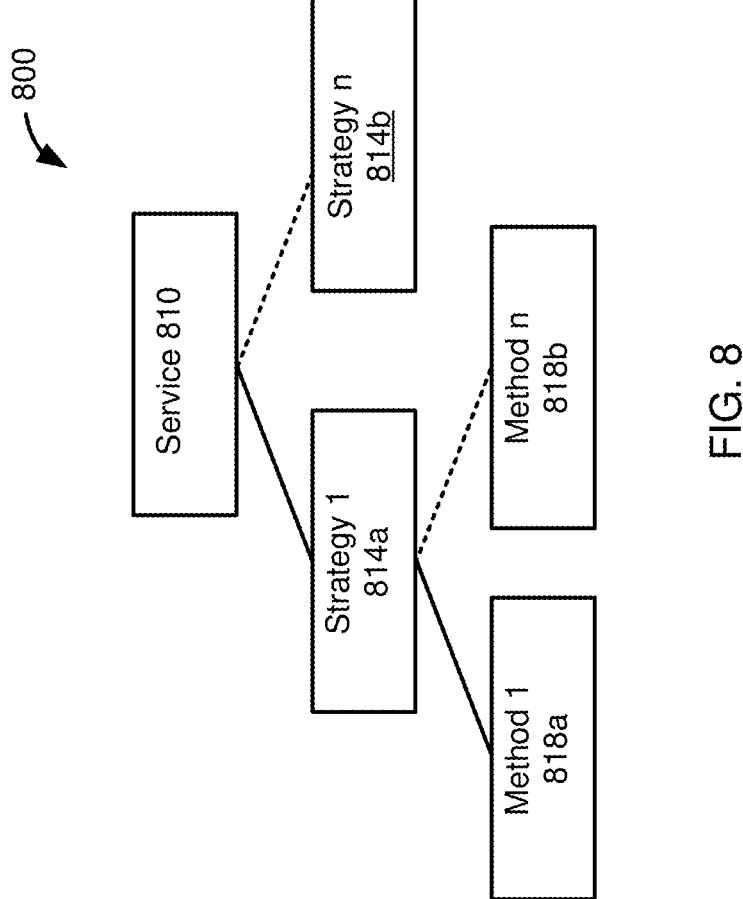
FIG. 8 illustrates an example process controller process representation, with relationships between process controller services, strategies, and methods.

FIG. 8 illustrates a graph 800 of relationships between components of a process controller representation of a business process. A highest, most general level of the graph can correspond to a service 810. The service 810 is in turn linked to one or more strategies 814, shown as a first strategy 814a and an $n^{th}$ strategy 814b. A given strategy 814 can be linked to one or more methods 818, shown as a first method 818a and an $n^{th}$ method 818b. Typically, a graph 800 can have multiple services 810, but each service is only linked to one or more strategies 814. Similarly, typically strategies 814 are only linked to one or more process controller methods 818. So, process controllers often only allow for relationships with components at lower hierarchical levels, not between components at the same hierarchical level or between a component at a lower level and a component at a higher (more general) level (referred to as upwardly callable).

The consequence of these types of relationships is that a method, for example, can only be linked to other methods or other executable components that are used to execute the method. Similarly, a strategy can only be linked to methods, not to other strategies or to services. This can limit business process definitions, which can make it more difficult to create or modify process controller representation for a business process model.

For example, it may be useful to include multiple methods in a strategy. In typical process controller representations, each method would need to be individually specified for the strategy. According to disclosed techniques, a method can refer to a service or a strategy. Assuming a second strategy uses methods that would be used with a method of a first strategy, the method can be defined to refer to the second strategy, rather than having to individually assign all of the individual methods directly to the first strategy. Viewed another way, the ability of lower-level components to reference higher level components allows grouping concepts to be applied to lower levels the process controller representation hierarchy.

Among other things, the ability of process controller methods to call process controller services or process controller strategies can be useful in cloud services that utilize services of local computing systems. That is, methods of a process controller representation of the cloud service can call services or strategies of the local systems. Along with facilitating management of processes that span diverse systems, these techniques can facilitate reuse of processes and code developed for local systems, as a cloud system can include a library of cloud process controller representations as well as a library of local process controller representations, callable using a method of process controller representation of the cloud system.

Figure 9:
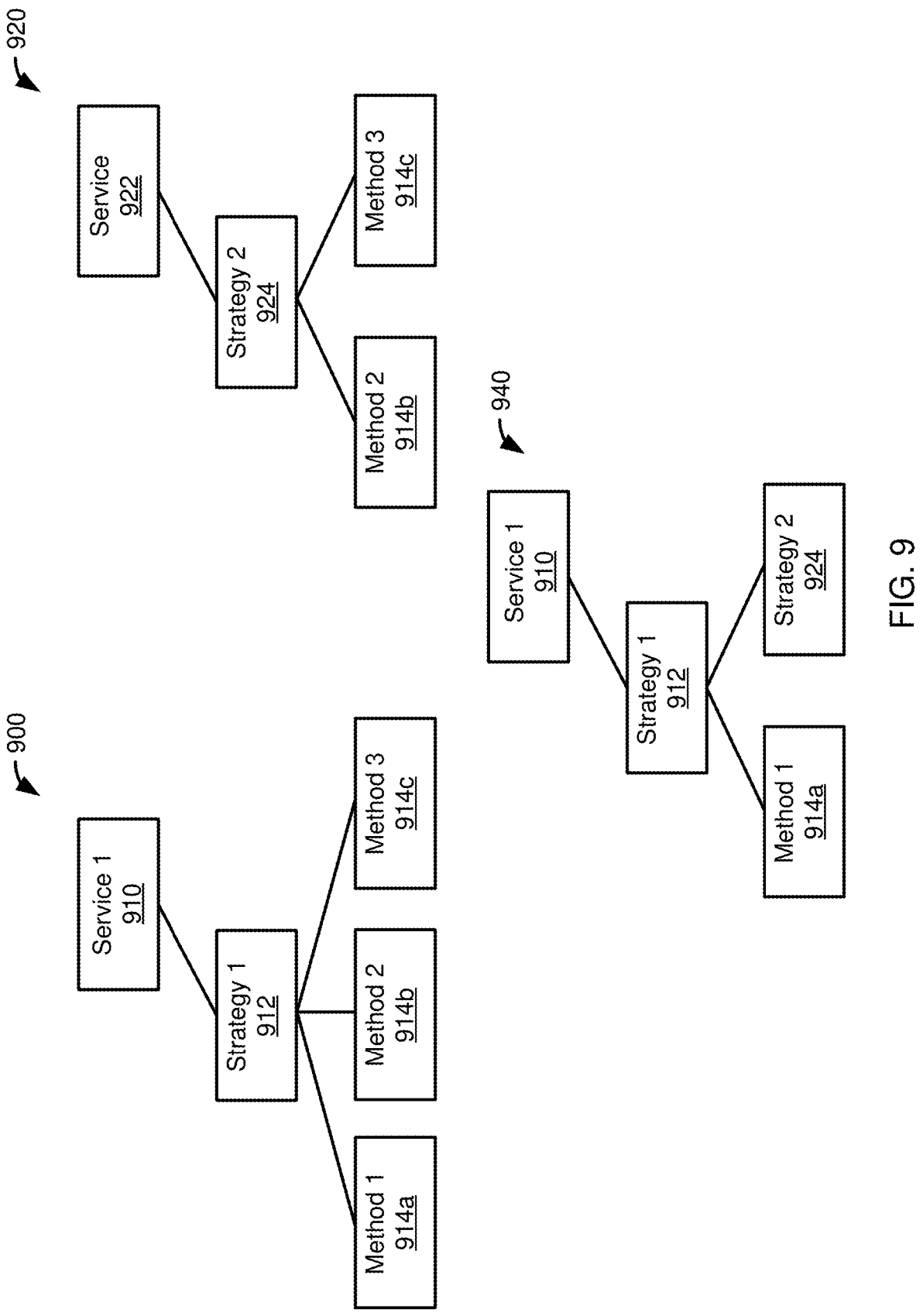
FIG. 9 illustrates an example process controller representation, and how a process controller method can call a process controller strategy.

FIG. 9 illustrates how these concepts can be applied. A graph 900 illustrates a service 910 that is associated with a single strategy 912, and where the strategy uses three methods 914a-914c. Another graph (process controller representation) 920 for a service 922 (which can be the service 910 or another service) defines a second strategy 924 that uses methods 914b, 914c. The graph 900 can be modified to provide a graph 940, which corresponds to the graph 900, except that the strategy 912 of the graph 940 now references the method 914a and the second strategy 924. Through the reference to the second strategy 924, the service 910 still includes the methods 914b, 914c.

Figure 10:
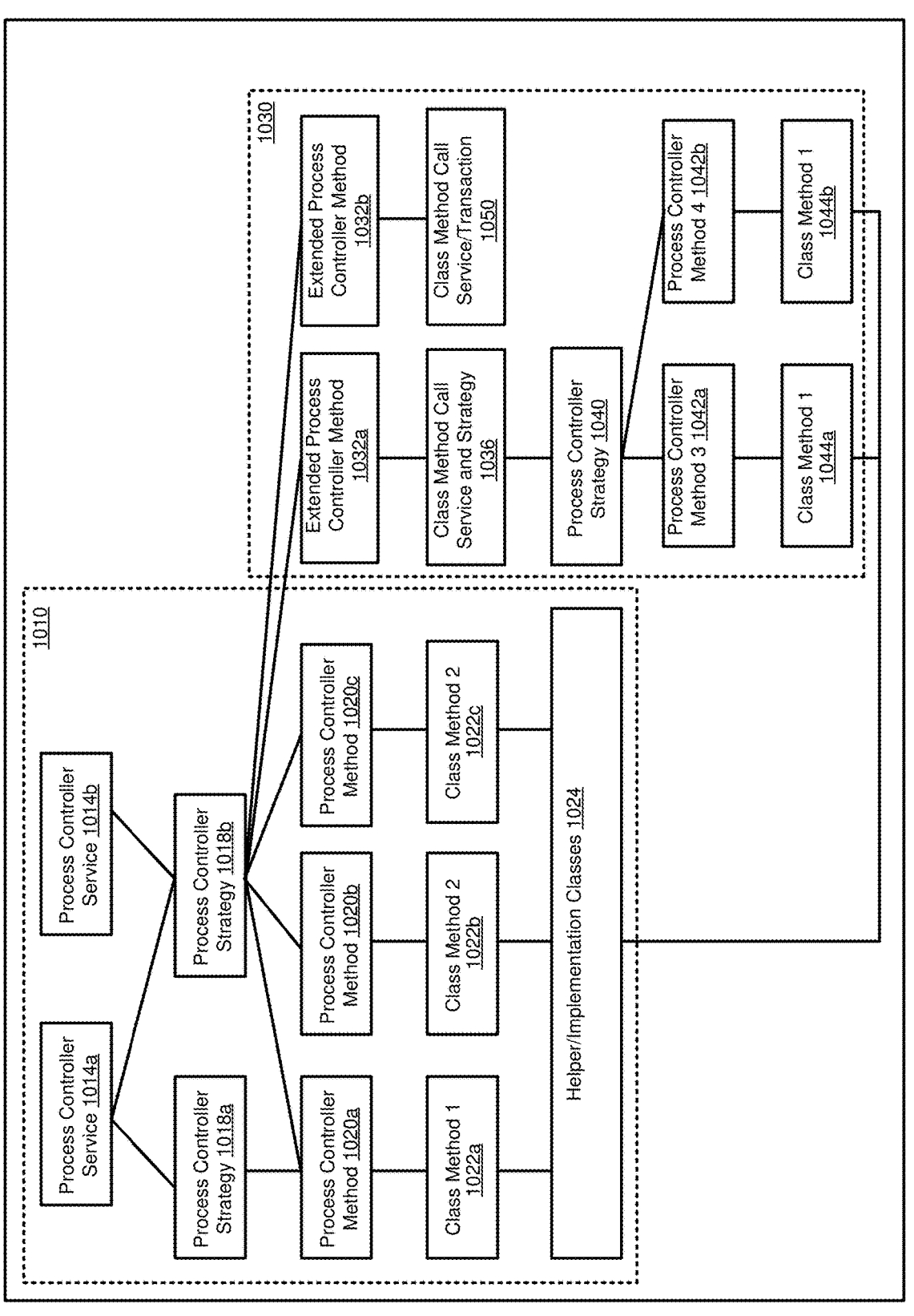
FIG. 10 provides a more detailed illustration of a typical process controller representation and a process controller representation according to the present disclosure, where process controller methods can call process controller services or process controller strategies.

FIG. 10 provides another illustration of typical process controller representations and an extended process controller representation (and corresponding controller functionality) according to the present disclosure. Box 1010 includes components of a typical process controller representation, where process controller services 1014a, 1014b reference one or both of strategies 1018a, 1018b. In turn, the process controller strategies 1018a, 1018b can call one or more of process controller methods 1020a-1020c. The process controller methods 1020a-1020c provide a bridge from a process definition to development objects (executable code or computing services), as class methods (as an example) 1022a-1022c are associated with the process controller methods. Optionally, the class methods 1022a-1022c can use various helper/implementation classes 1024.

Box 1030 illustrates innovations provided by the present disclosure. It can be seen that the strategy 1018b also calls extended process controller methods 1032a, 1032b. The extended process controller method 1032a is associated with a call 1036 to a process controller strategy 1040 that in turn is linked to process controller methods 1042a, 1042b, which in turn are linked to class methods 1044a, 1044a. As with the class methods 1022a-1022c, the class methods 1044a, 1044b can access the helper/implementation classes 1024.

The extended process controller method 1032b can call a process controller service 1050. In some cases, a call to a service can be a call to a specific transaction associated with the process controller service 1050.

Figure 11:
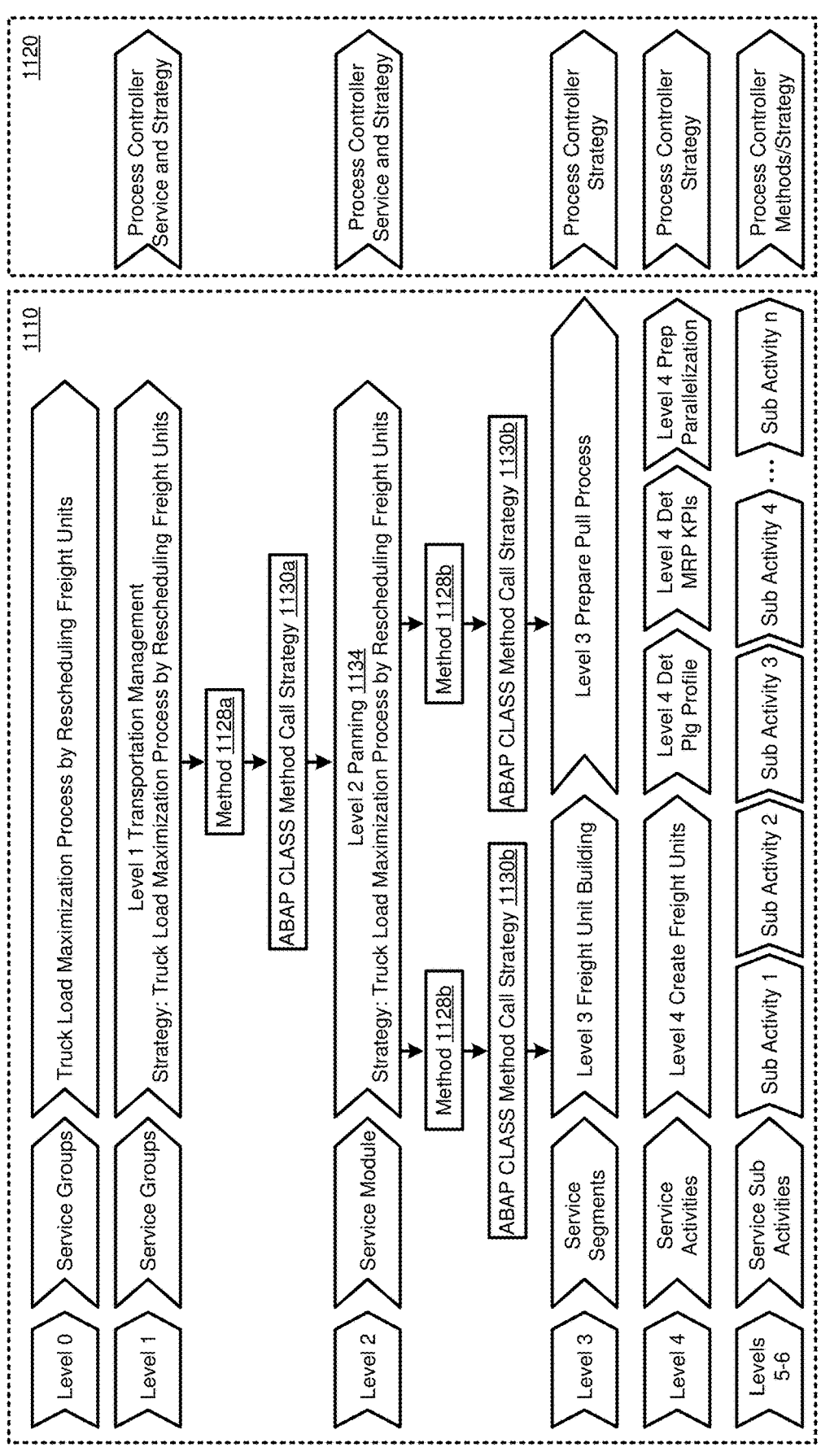
FIG. 11 illustrates a portion of the process definition of FIG. 6, incorporating process controller method calls to process controller strategies.

Example 5—Example Relationship Between Business Process Model and Process Controller Representation FIG. 11 illustrates how the extended process controller described in Example 3 can be applied to a business process model, such as the tabular representation 700 in FIG. 7 of a portion of the hierarchical process model 600 depicted in FIG. 6.

The left portion of FIG. 11 provides a business process model representation 1110 that is generally the same as the tabular representation 700, having been extended to include a generic representation of levels 5 and 6 of the hierarchy of the business process model. The elements of column 1120 associate the levels of the business process model representations with components/levels of a process controller representation. It can be seen that levels 1 and 2 of the business process model 1110 correspond to process controller services and strategies. That is, for example, levels 1 and 2 both identify high level software components used for process implementation, where level 1 identifies the Transportation Management software product of SAP SE, while level 2 specifies that the planning module of the Transportation Management software component is used.

Levels 1 and 2 can also be referred to as strategies, as they include specific methods, 1128*a*, 1128*b* that call respective ABAB class methods 1130*a*, 1130*b* that call, respectively, the strategy/service of level 2, or subprocesses/strategies of level 3. When a strategy is called, such as a strategy 134, the strategy can be provided with parameters for methods 1128 defined for the strategy. For example, a call to the strategy 134 can include parameters for use in the methods 1128*b*.

The process/strategies of level 3 are divided into more specific process strategies of level 4, which in turn call process controller methods of levels 5 and 6 (where optionally additional lower levels can be included in the hierarchy). As described, the process controller methods can call specific software functionality, such as ABAP class methods or software services, to implement the process controller methods associated with a process strategy.

FIG. 11 thus illustrates how a business process model can include strategies that call other strategies to provide more flexible processes controller representations compared with a scenario where strategies only call particular process controller methods.

Note also that FIG. 11 illustrates how a cloud computing system can manage a process that uses one or more local systems. That is, for example, levels 1 and 2 of the hierarchy can correspond to a cloud-based process, where the methods 1128*b* in turn call local strategies that cause process operations to be executed on a local computing system.

Example 6—Example User Interface for Business Process Model Expansion

Disclosed innovations can be incorporated into business process model software, such as software that can be used to create or edit business process models. For example, disclosed innovations can be included in SIGNAVIO, available from SAP SE, of Walldorf, Germany. In particular, as shown in FIG. 12, a user can be provided with a user interface control that can be used to link a particular strategy of a process controller with another process controller strategy or a process controller service, including by manipulating a representation of a business process model.

Figure 12:
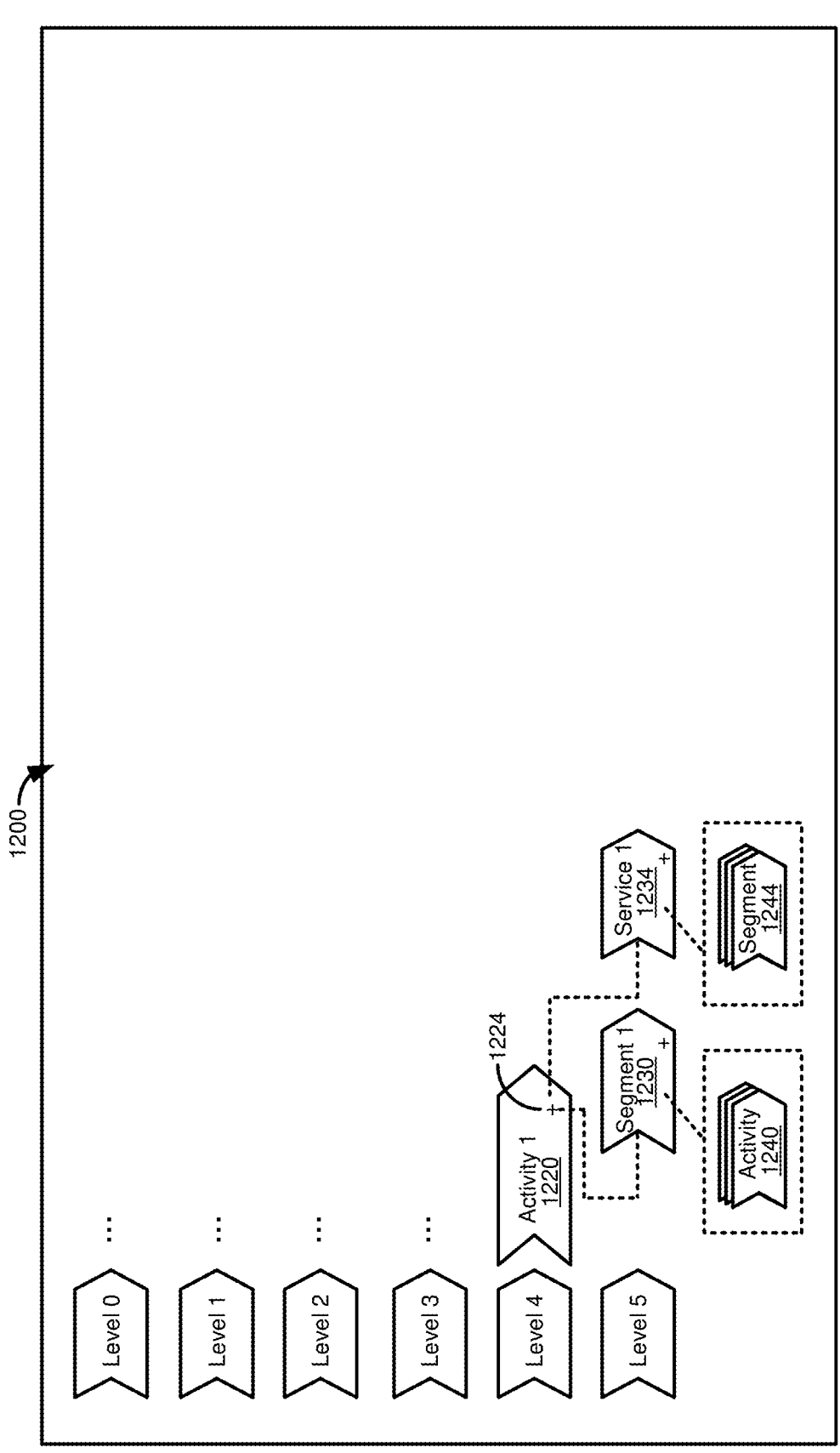
FIG. 12 provides a portion of an example user interface allowing a user to expand components of a hierarchical process model definition, including to call higher-level process model components.

FIG. 12 can represent information displayed on a user interface 1200. The user interface 1200 can list business process model components in a level-based format analogous to that shown in FIGS. 6 and 11. For simplicity of presentation, levels 0-3 are represented in FIG. 12, but not specific components for these levels. An activity 1220 for level 4 of the hierarchy is shown as including an expand control 1224. By selecting the expand control 1224, a user can create a segment 1230 or a service 1234 that is linked to the activity 1220. In terms of a process controller representation, the segment 1230 can correspond to a strategy, while the service 1234 can correspond to a process controller service. Again, this approach differs from prior approaches where strategies are confined to being linked to process controller methods.

The user interface 1200 also illustrates how the segment 1230 can be linked to one or more activities 1240 (which can correspond to process controller methods) and how the service 1234 can be linked to one or more segments 1244 (which can correspond to process controller strategies). In turn, segments of the one or more segments 1244 can be linked to additional services, segments (process controller strategies), or activities (process controller methods). Note that the segments 1230, and services 1234 may not be displayed on the user interface 1200, or at least displayed as shown in FIG. 12. That is, the segments 1230, services 1234, and associated content are provided to further an understanding of disclosed techniques.

As described earlier, selecting user interface controls in a BPM definition/visualization tool, such as the expand control 1224, can cause lower-level objects to be automatically created. For levels of the BPM that are more implementation focused, creating a BPM object at a particular level can result in the creation of a process controller representation. For example, selection of the expand control 1224 can cause the creation of an object for a process controller strategy. Similarly, when the BPM is used for process execution, the activity 1220 can be used to trigger one or more corresponding process controller strategies.

Example 7—Example Tuple Representation of Process Controller Elements

Figure 13:
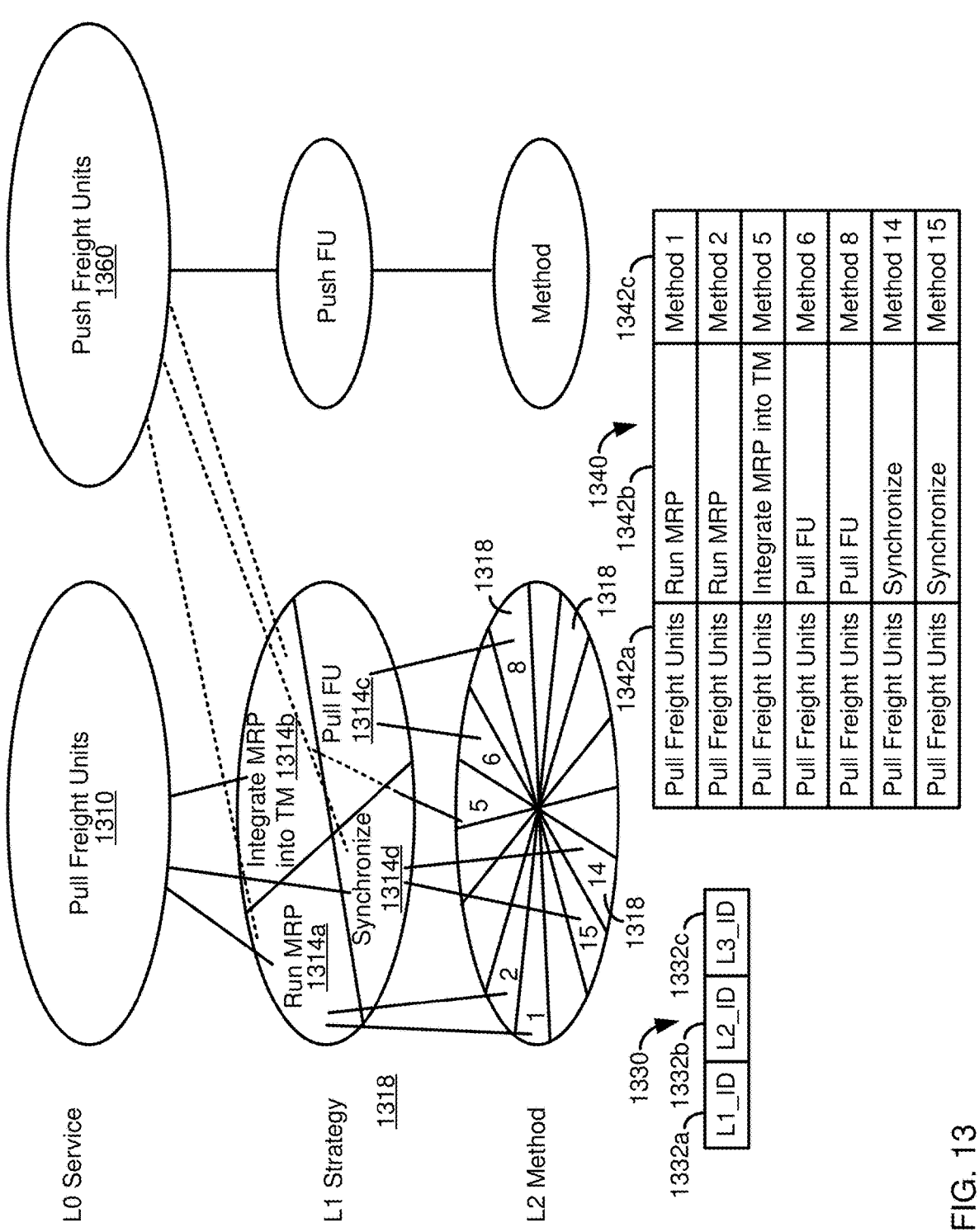
FIG. 13 illustrates relationships between process controller representation services, strategies, and methods, including how these components can be represented as tuples.

FIG. 13 illustrates how process controller components (services, strategies, and methods) can be represented as a hierarchy of three levels. A first level (level 0) includes the "pull freight units" service 1310, which can correspond to a segment of a business process model hierarchy, similar to the business process 600 illustrated in FIG. 6.

The service 1310 includes strategies (corresponding to process steps of the business process model) 1314*a*-1314*d*, at a second level (level 1) of the hierarchy. In turn, respective strategies 1314*a*-1314*d* are mapped to one or more methods 1318 at the third level (level 2) of the hierarchy. As discussed, the methods 1318 serve as a bridge between a description of a business process and executable components that can be used to carry out the business process.

It can be seen that FIG. 13 provides a variety of grouping mechanisms. That is, the service 1310 serves to group the strategies 1314*a*-1314*d*, while each strategy groups its one or more corresponding methods 1318.

The service 1310 and its components can be described as tuples, such as a three-element tuple. FIG. 13 illustrates an example tuple definition 1330. A first element 1332*a* of the tuple definition provides an identifier of a service. A second element 1332*b* of the tuple definition provides an identifier of a strategy, while a third element 1332*c* of the tuple provides an identifier of a method. The tuple definition 1330 thus can be used to describe services and their associated methods and strategies.

Table 1340 lists tuples for the service 1310, where a first column 1342*a* of the table provides a level 0 identifier, a column 1342*b* provides a level 1 identifier, and a column 1342*c* provides a level 2 identifier.

Although the tuples have been described as having three elements, the tuples can have differing numbers of elements, including scenarios where different process controller representations can have tuples with differing numbers of elements, or where some process controller representations have null values. For example, as described, a process controller representation can have a service and a strategy, and a method that calls another service or strategy, which in turn can have additional services, strategies, and methods. Thus, a tuple can have a number of elements equal to the depth of the hierarchy (L0, L1, L2, . . . , Ln). Similarly, at least beyond the third tuple element, tuple elements can represent different types of process controller elements. That is, for example, in a tuple with four elements, the fourth element can correspond to a service in some cases, and a strategy in others.

As described, disclosed techniques can provide a catalog of instances of particular levels of a business process hierarchy or a process controller representation. The tuples serve as ways to locate particular instances, as well as describing relationships between instances. The tuples can be used to assist in designing business processes, particularly process controller representations that can be used to execute a process. When the tuples represent local process controller representations, the first element of the tuple can be used to identify a particular local computing system that offers the service. Tuples can also be used to identify documentation associated with specific process controller representations, or components thereof.

As an example, consider a service 1360 shown in FIG. 13. While the service 1310 corresponds to a process to pull freight units, the service 1360 corresponds to a process to push freight units. Although there are some differences between the services 1310, 1360, there are also similarities. Thus, a user wishing to design or implement the process 1360 may be able to leverage an existing library of business process/process controller elements. That is, the tuples can be used to locate services, strategies, and methods that may already exist for the pull process 1310 and be useable in executing the push process 1360. The absence of a particular tuple can indicate additional functionality that needs to be developed or otherwise provided for the process 1360.

Example 8—Example Use of Disclosed Techniques for Top-Down or Bottom-Up Process Definition Disclosed techniques can be used for both top down and bottom-up model development. That is, a high-level BPM can be created, and execution information gradually added, such as activities or execution components, which can be converted to services, strategies, and methods in a process controller representation. During top-down modelling, a library of various components can be provided as described with respect to FIG. 13. The library can be searched to provide components at a particular level (including levels associated with particular software applications or components, or associated with particular processes or subprocesses defined for such applications and components). The tuple information can then be used to identify related, lower-level process controller elements. A user may select to add new elements, including new segments and services, such as described with respect to FIG. 12, to create variants of existing processes.

In a particular scenario, an initial business process model can be created, and elements of the business process model can be correlated with process controller services and their associated strategies and methods. A user can then select particular services, strategies and methods from a library that may be useful in creating an executable version of that initial business process model.

Disclosed techniques can also be used for bottom-up model development. For example, particular subprocesses, execution components, or execution subcomponents (and their corresponding components in a process controller representation) can be selected, and tuple information can be used to identify related, higher-level components that can be used to define a process. Using the disclosed improved process controller, lower-level components, such as methods of a process controller representation, can be used to call higher-level components, such as services or strategies, further facilitating model development.

Example 9—Example Process of Defining and Executing a Process Controller Representation of a Process Model FIG. 14 is a flowchart of a process 1400 of defining and executing a process controller representation of a process model, where a method of the process controller representation calls a process controller service or a process controller strategy.

At 1410, a first process model is obtained that includes at least one process defined as a series of a plurality of subprocesses. A first process controller service is generated at 1420, corresponding to a first subprocess of the plurality of subprocesses. A first process controller strategy, corresponding to the first process controller service, is generated at 1430. At 1440, one or more process controller methods are associated with the first process controller strategy. For a process controller method of the one or more process controller methods, at 1450, the method is configured to call (1) a second process controller service or (2) a second process controller strategy. At 1460, at least the first process controller service, the first process controller strategy, and the process controller method in a process controller process representation are stored. The process controller process representation is executed at 1470 to execute the at least one process.

Example 10—Computing Systems

Figure 15:
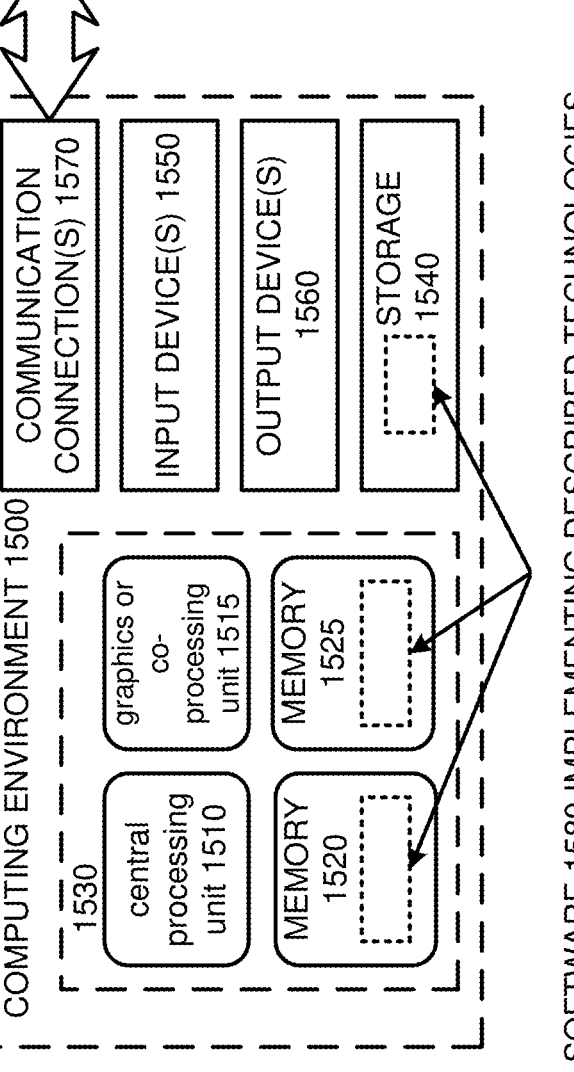
FIG. 15 is a diagram of an example computing system in which some described embodiments can be implemented.

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing disclosed innovations, including as described in Examples 1-9. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way, and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 16:
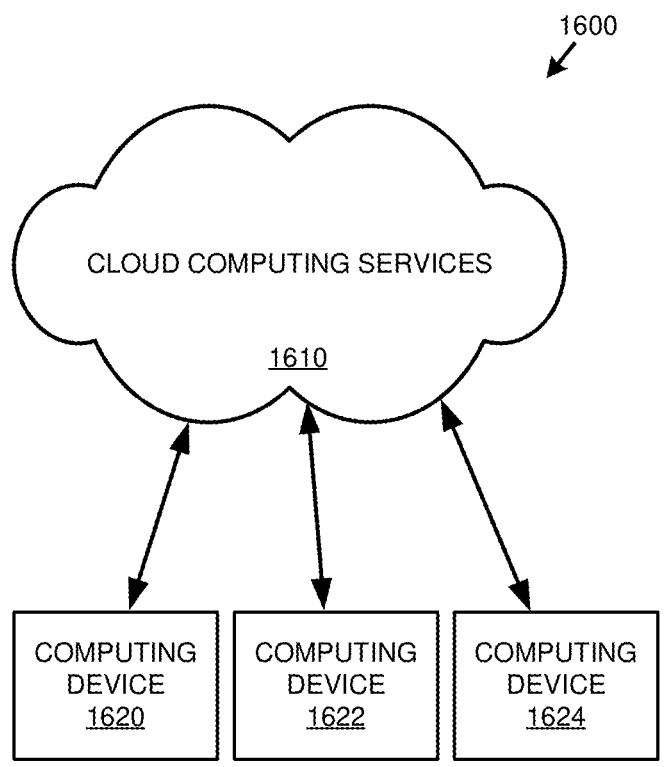
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:
1. At least one hardware processor;
at least one hardware processor;
at least one memory coupled to the at least one hardware processor; and
one or more computer-readable storage media storing computer-executable instructions that, when executed, cause the computing system to perform operations comprising:
obtaining, via a user interface or automated import process, a first process model as a set of one or more process model computing objects (model objects) comprising executable process definitions, the first process model being hierarchical and defining at least one process as a series of a plurality of sub-processes, wherein the set of model objects comprises:
(i) one or more process controller service computing objects (service objects), each comprising one or more process controller strategy computing objects (strategy objects) defining subprocess functionality; and
(ii) one or more process controller method computing objects (method objects) that implement executable portions of the strategy objects and comprise executable code executable by the at least one hardware processor;

generating a first service object corresponding to a first subprocess of the plurality of subprocesses, the first service object representing executable functionality for the first subprocess;
generating a first strategy object depending from the first service object, the first strategy object identifying a set of executable actions to be carried out using the one or more method objects;
associating the one or more process controller methods as depending from the first strategy object, each method object being implemented as, or within, an executable computing object;
for a method object of the one or more method objects, configuring the method object to call (1) a second service object or (2) a second strategy object;
storing at least the first service object, the first strategy object, and the one or more method objects in a process controller process representation, wherein the process controller process representation defines executable controller logic and control-flow parameters; and
executing the process controller process representation to execute the at least one process by invoking executable code defined by the process controller process representation, including invoking service objects or strategy objects using the one or more method objects.

2. The computing system of claim 1, wherein the executing the process controller process representation is performed as a cloud service of a cloud computing system, the operations further comprising:
during execution of the process controller process representation, sending a command to a local computing system to invoke the second service object or the second strategy object.

3. The computing system of claim 2, the operations further comprising:
receiving a business process model representation of a business process; and
from the business process model representation, generating one or more service objects defined for a software application of the local computing system.

4. The computing system of claim 3, the operations further comprising:
for a service object of the one or more service objects corresponding to a software application of the local computing system, defining a method object that calls a strategy object defined for a software module or component of the software application.

5. The computing system of claim 4, the operations further comprising:
for a strategy object defined for a software module of the software application, defining a method object that calls a service object corresponding to a subprocess of the business process.

6. The computing system of claim 5, wherein the method object that calls a subprocess of the business process calls a strategy object for which one or more method objects are defined, wherein given method objects of the one or more method objects calls a respective computing service or executable computing object or code.

7. The computing system of claim 1, the operations further comprising:
generating tuple representations of one or more process controller representations defined for the first process model, where a given tuple representation comprises an element comprising a service identifier, an element comprising a strategy identifier, and an element comprising a method identifier.

8. The computing system of claim 7, the operations further comprising:
   receiving an identifier of a service object; and
   identifying one or more strategy objects defined for the service object.

9. The computing system of claim 7, the operations further comprising:
   receiving an identifier of a strategy object; and
   identifying one or more method objects defined for the strategy object.

10. The computing system of claim 7, the operations further comprising:
   receiving an identifier of a strategy object; and
   identifying one or more service objects for which the strategy object is defined.

11. The computing system of claim 7, the operations further comprising:
   receiving an identifier of a method object; and
   identifying one or more strategy objects for which the method object is defined.

12. The computing system of claim 1, the operations further comprising:
   rendering a display of at least a portion of elements of the first process model;
   receiving a selection of a user interface control defined for an element of the at least a portion of elements of the first process model; and
   in response to the selection of the user interface control, generating a new process model segment or a new process model service.

13. The computing system of claim 1, wherein the second service object is associated with at least a second process model.

14. A method, implemented in a computing system comprising at least one hardware processor and at least one memory coupled to the at least one hardware processor, the method comprising:
   obtaining, via a user interface or automated import process, a first process model as a set of one or more process model computing objects (model objects) comprising executable process definitions, the first process model being hierarchical and defining at least one process as a series of a plurality of subprocesses, wherein the set of model objects comprises:
      (i) one or more process controller service computing objects (service objects), each comprising one or more process controller strategy computing objects (strategy objects) defining subprocess functionality; and
      (ii) one or more process controller method computing objects (method objects) that implement executable portions of the strategy objects and comprise executable code executable by the at least one hardware processor;
   generating a first service object corresponding to a first subprocess of the plurality of subprocesses, the first service object representing executable functionality for the first subprocess;
   generating a first strategy object depending from the first service object, the first strategy object identifying a set of executable actions to be carried out using the one or more method objects;

associating the one or more process controller methods as depending from the first strategy object, each method object being implemented as, or within, an executable computing object;
for a method object of the one or more method objects, configuring the method object to call (1) a second service object or (2) a second strategy object;
storing at least the first service object, the first strategy object, and the one or more method objects in a process controller process representation, wherein the process controller process representation defines executable controller logic and control-flow parameters; and
executing the process controller process representation to execute the at least one process by invoking executable code defined by the process controller process representation, including invoking service objects or strategy objects using the one or more method object.

15. The method of claim 14, wherein the executing the process controller process representation is performed as a cloud service of a cloud computing system, the method further comprising:
   during execution of the process controller process representation, sending a command to a local computing system to invoke the second service object or the second strategy object.

16. The method of claim 15, further comprising:
   receiving a business process model representation of a business process; and
   from the business process model representation, generating one or more service objects defined for a software application of the local computing system.

17. The method of claim 16, further comprising:
   for a service object of the one or more service objects corresponding to a software application of the local computing system, defining a method object that calls a strategy object defined for a software module or component of the software application.

18. The method of claim 17, further comprising:
   for a strategy object defined for a software module of the software application, defining a method object that calls a service object corresponding to a subprocess of the business process.

19. One or more computer readable storage media comprising:
   computer-executable instructions that cause a computing system to obtain, via a user interface or automated import process, a first process model as a set of one or more process model computing objects (model objects) comprising executable process definitions, the first process model being hierarchical and defining at least one process as a series of a plurality of subprocesses, wherein the set of model objects comprises:
      (i) one or more process controller service computing objects (service objects), each comprising one or more process controller strategy computing objects (strategy objects) defining subprocess functionality; and
      (ii) one or more process controller method computing objects (method objects) that implement executable portions of the strategy objects and comprise executable code executable by the at least one hardware processor;
   computer-executable instructions that, when executed by the computing system, cause the computing system to generate a first service object corresponding to a first subprocess of the plurality of subprocesses, the first service object representing executable functionality for the first subprocess;

computer-executable instructions that, when executed by the computing system, cause the computing system to generate a first strategy object depending from the first service object, the first strategy object identifying a set of executable actions to be carried out using the one or more method objects;

computer-executable instructions that, when executed by the computing system, cause the computing system to associate the one or more process controller methods as depending from the first strategy object, each method object being implemented as, or within, an executable computing object;

computer-executable instructions that, when executed by the computing system, cause the computing system to, for a method object of the one or more method objects, configure the method object to call (1) a second service object or (2) a second strategy object;

computer-executable instructions that, when executed by the computing system, cause the computing system to store at least the first service object, the first strategy object, and the one or more method objects in a process controller process representation, wherein the process controller process representation defines executable controller logic and control-flow parameters; and computer-executable instructions that, when executed by the computing system, cause the computing system to execute the process controller process representation to execute the at least one process by invoking executable code defined by the process controller process representation, including invoking service objects or strategy objects using the one or more method objects.

20. The one or more computer readable storage media of claim 19, further comprising:

computer-executable instructions that, when executed by the computing system, cause the computing system to, during execution of the process controller process representation, send a command to a local computing system to invoke the second service object or the second strategy object.

* * * * *